(12) United States Patent
Nakamura et al.

(10) Patent No.: US 11,211,668 B2
(45) Date of Patent: *Dec. 28, 2021

(54) POWER STORAGE APPARATUS

(71) Applicant: KABUSHIKI KAISHA TOYOTA JIDOSHOKKI, Kariya (JP)

(72) Inventors: Tomohiro Nakamura, Kariya (JP); Takayuki Hirose, Kariya (JP); Yusuke Yamashita, Kariya (JP); Masato Ogasawara, Kariya (JP); Shinji Suzuki, Kariya (JP); Yasuaki Takenaka, Kariya (JP); Ryuji Oide, Kariya (JP); Mikiya Kurita, Kariya (JP); Atsushi Minagata, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 427 days.

This patent is subject to a terminal disclaimer.

(21) Appl. No.: 16/088,349

(22) PCT Filed: Mar. 31, 2017

(86) PCT No.: PCT/JP2017/013594
§ 371 (c)(1),
(2) Date: Sep. 25, 2018

(87) PCT Pub. No.: WO2017/171003
PCT Pub. Date: Oct. 5, 2017

(65) Prior Publication Data
US 2020/0303702 A1  Sep. 24, 2020

(30) Foreign Application Priority Data

Aug. 15, 2016 (JP) .............................. JP2016-159347
Aug. 15, 2016 (JP) .............................. JP2016-159347

(51) Int. Cl.
*H01M 10/00* (2006.01)
*H01M 50/342* (2021.01)
(Continued)

(52) U.S. Cl.
CPC ........ *H01M 50/3425* (2021.01); *H01G 11/14* (2013.01); *H01G 11/26* (2013.01);
(Continued)

(58) Field of Classification Search
CPC ........... H01M 50/3425; H01M 50/463; H01M 50/531; H01M 2200/20; H01M 2220/20;
(Continued)

(56) References Cited

U.S. PATENT DOCUMENTS 10,916,751 B2 * 2/2021 Yamashita ............. H01G 11/78
2006/0117701 A1 * 6/2006 Kajimura ............ H01M 50/317
52/650.1
(Continued)

FOREIGN PATENT DOCUMENTS

CN 104319360 A * 1/2015 .......... H01M 50/383
JP 61-140056 A 6/1986
(Continued)

OTHER PUBLICATIONS

International Preliminary Report on Patentability with translation of Written Opinion dated Oct. 2, 2018, issued by the International Searching Authority in application No. PCT/JP2017/013594.
(Continued)

*Primary Examiner* — Nicholas P D'Aniello
(74) *Attorney, Agent, or Firm* — Sughrue Mion, PLLC

(57) ABSTRACT

A power storage apparatus has a case accommodating an electrode assembly, and a release valve present in the wall of the case. The electrode assembly includes electrodes. A shielding member is arranged between the inner surface of the wall and the end surface of the electrode assembly. A
(Continued)

point located in a center of the case in a front view of the case taken in the stacking direction of the electrodes and located in a center of a dimension of the electrode assembly in the stacking direction is a center point, and a region surrounded by a plane connecting the center point and a contour of the pressure release valve at a shortest distance is a three-dimensional region. The shielding member includes a shielding portion that entirely covers a cross section of the three-dimensional region along the end face of the electrode assembly.

30 Claims, 17 Drawing Sheets

(51) Int. Cl.
*H01G 11/14* (2013.01)
*H01G 11/26* (2013.01)
*H01G 11/58* (2013.01)
*H01M 50/463* (2021.01)
*H01M 50/531* (2021.01)

(52) U.S. Cl.
CPC .......... *H01G 11/58* (2013.01); *H01M 50/463* (2021.01); *H01M 50/531* (2021.01); *H01M 2200/20* (2013.01); *H01M 2220/20* (2013.01)

(58) Field of Classification Search
CPC .... H01M 50/147; H01M 50/30; H01M 50/40; H01M 50/572; H01M 10/0585; H01M 10/0413; H01M 50/317; H01G 11/14; H01G 11/26; H01G 11/58; H01G 11/78; Y02P 70/50; Y02E 60/10
See application file for complete search history.

(56) References Cited

U.S. PATENT DOCUMENTS

| | | | |
|---|---|---|---|
| 2011/0091752 A1 | 4/2011 | Kim et al. | |
| 2012/0088128 A1 | 4/2012 | Matsuura et al. | |
| 2014/0127538 A1* | 5/2014 | Uruno | H01M 50/383 |
| | | | 429/53 |
| 2015/0147605 A1 | 5/2015 | Kim et al. | |
| 2016/0133901 A1* | 5/2016 | Li | H01M 50/394 |
| | | | 429/56 |

FOREIGN PATENT DOCUMENTS

| | | | | |
|---|---|---|---|---|
| JP | 2000-182591 A | | 6/2000 | |
| JP | 2000-331661 A | | 11/2000 | |
| JP | 2000331661 A | * | 11/2000 | |
| JP | 2011-086604 A | | 4/2011 | |
| JP | 4881409 B2 | | 2/2012 | |
| JP | 2015-159087 A | | 9/2015 | |
| JP | 2015159087 A | * | 9/2015 | |
| WO | 2013/011915 A1 | | 1/2013 | |

OTHER PUBLICATIONS

International Search Report for PCT/JP2017/013594 dated Jun. 20, 2017.

* cited by examiner

POWER STORAGE APPARATUS

CROSS REFERENCE TO RELATED APPLICATIONS

This application is a National Stage of International Application No. PCT/JP2017/013594 filed Mar. 31, 2017, claiming priority based on Japanese Patent Application Nos. 2016-072534 filed Mar. 31, 2016 and 2016-159347 filed Aug. 15, 2016.

TECHNICAL FIELD

The present invention relates to a power storage apparatus including a pressure release valve.

BACKGROUND ART

A rechargeable battery, such as a lithium ion battery, is mounted as a power storage apparatus that stores power supplied to an electrical motor, which is a prime mover, installed in a vehicle such as an electric vehicle (EV), a plug-in hybrid vehicle (PHV), or the like. Patent document 1 describes an example of a rechargeable battery accommodating an electrode assembly and an electrolytic solution in a case. A pressure release valve is arranged in the wall of the case to release pressure out of the case.

PRIOR ART DOCUMENTS

PATENT DOCUMENT PATENT DOCUMENT 1: Japanese Patent No. 4881409

SUMMARY OF THE INVENTION

Problems that are to be Solved by the Invention

When a nail penetration test, which is one type of evaluation test, is carried out on such a rechargeable battery, a nail breaks a separator located between a positive electrode and a negative electrode. This short-circuits the positive electrode and the negative electrode in the case. When such short-circuiting occurs, heat is generated around the short-circuited part. The heat decomposes the electrolytic solution component and generates gas in the case. This may raise the pressure in the case and rip open the pressure release valve. When the gas is released from the pressure release valve out of the case, parts of the electrodes may be scraped by the high pressure gas, and such parts of the electrodes may be carried out of the gas and scattered as fragments.

It is an object of the present invention to provide an electric storage device that obviates the scattering of electrode fragments from the ripped open pressure release valve during the nail penetration test.

Means for Solving the Problem

A power storage apparatus that solves the above problem includes an electrode assembly having a layered structure, an electrolytic solution, a case that accommodates the electrode assembly and the electrolytic solution, and a pressure release valve that exists in a wall of the case. The electrode assembly includes electrodes that are insulated from each other and have different polarities. The pressure release valve is configured to be ripped open when pressure in the case reaches a release pressure in order to release the pressure out of the case. The power storage apparatus includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a point located in a center of the case in a front view of the case taken in a direction of the X-axis and located in a center of a dimension of the electrode assembly in the direction of the X-axis is referred to as a center point, and a region surrounded by a plane connecting the center point and a contour of the pressure release valve at a shortest distance is referred to as a three-dimensional region. The shielding member includes a shielding portion that entirely covers a cross section of the three-dimensional region along the end face of the electrode assembly.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part passes through the three-dimensional region from the center point and flows toward the ripped-open pressure release valve. The force of the generated gas scrapes parts of the electrodes and produces fragments. The shielding portion is located between the ripped-open pressure release valve and the cross section of the three-dimensional region and covers the entire cross-sectional plane. Thus, the gas discharged out of the electrode assembly from the cross section of the three-dimensional region strikes the shielding portion. This changes the direction of the gas flowing toward the pressure release valve and lengthens the gas discharge path extending toward the pressure release valve. As a result, the electrode fragments fall out of the gas. This limits the electrode fragments that are scattered out of the case from the ripped-open pressure release valve.

A power storage apparatus that solves the above problem includes an electrode assembly having a layered structure, an electrolytic solution, a case that accommodates the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The power storage apparatus includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a plane that passes through a center of the case in a front view of the case taken in the direction of the X-axis and is parallel to the end face of the electrode assembly is referred to as a hypothetical plane, a line reflecting a straight line connecting two ends of the pressure release valve in a direction of the Y-axis on the hypothetical plane as viewed from an outer surface of the wall is referred to as a hypothetical line, a plane formed by reflecting the hypothetical line entirely over a dimension of the electrode assembly in the direction of the X-axis is referred to as a bottom plane, and a region surrounded by a plane connecting a contour of the bottom plane and a contour of the pressure release valve at a shortest distance is referred to as a three-dimensional region. The shielding member includes a shielding portion that covers the entire cross section of the three-dimensional region along the end face of the electrode assembly.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part passes through the three-dimensional region from any given location in the bottom plane and flows toward the ripped-open pressure release valve. The force of the generated gas scrapes parts of the electrodes and produces fragments. The shielding portion is located between the ripped-open pressure release valve and the cross section of the three-dimensional region and covers the entire cross-sectional plane. Thus, the gas discharged out of the electrode assembly from the cross section of the three-dimensional region strikes the shielding portion. This changes the direction of the gas flowing toward the pressure release valve and lengthens the gas discharge path extending toward the pressure release valve. As a result, the electrode fragments fall out of the gas. This limits the electrode fragments that are scattered out of the case from the ripped-open pressure release valve.

The shielding member may include a spacer on the shielding portion to contact a portion in the inner surface of the wall surrounding the pressure release valve to space apart the shielding portion and the wall.

Therefore, even if the shielding portion receives the gas pressure generated in the case, the spacer is in contact with the wall and holds the shielding portion and the wall in a spaced-apart state. Thus, even though the shielding member is located between the electrode assembly and the wall, the flow path of gas toward the pressure release valve is obtained, and the pressure release valve maintains the function for discharging gas out of the case.

The spacer is a plurality of spacer rods shaped to project from the shielding portion.

Therefore, the flow path of the gas is obtained between the adjacent spacer rods, and the pressure release valve maintains the function for discharging gas out of the case.

The spacer is a rib projected toward the wall from an edge of the shielding portion extending in a direction of the Y-axis.

Therefore, during the nail penetration test, the electrode assembly is expanded in the stacking direction (direction of the X-axis), and the gas flows toward the pressure release valve in the stacking direction. The gas strikes the rib, and electrode fragments fall out of the gas.

A power storage apparatus that solves the above problem includes an electrode assembly having a layered structure, an electrolytic solution, a case accommodating the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The power storage apparatus includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a point located in a center of the case in a front view of the case taken in a direction of the X-axis and located in a center of a dimension of the electrode assembly in the direction of the X-axis is referred to as a center point, and a region surrounded by a plane connecting the center point and a contour of the pressure release valve at a shortest distance is referred to as a three-dimensional region. The shielding member includes a shielding portion that partially covers a cross section of the three-dimensional region along the end face of the electrode assembly. The shielding member further includes a rib that contacts a portion in the inner surface of the wall surrounding the pressure release valve to space apart the shielding portion and the wall, wherein the rib is projected toward the wall from an edge of the shielding portion extending in a direction of the Y-axis.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part passes through the three-dimensional region from the center point and flows toward the ripped-open pressure release valve. The force of the generated gas scrapes parts of the electrodes and produces fragments. The shielding portion is located between the ripped-open pressure release valve and the cross section of the three-dimensional region and partially covers the cross-section. Thus, the gas discharged out of the electrode assembly from the cross section of the three-dimensional region strikes the shielding portion. This changes the direction of the gas flowing toward the pressure release valve and lengthens the gas discharge path extending toward the pressure release valve. As a result, the electrode fragments fall out of the gas. This limits the electrode fragments that are scattered out of the case from the ripped-open pressure release valve.

A power storage apparatus that solves the above problem includes an electrode assembly having a layered structure, an electrolytic solution, a case accommodating the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The power storage apparatus includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a plane that passes through a center of the case in a front view of the case taken in a direction of the X-axis and is parallel to the end face of the electrode assembly is referred to as a hypothetical plane, a line reflecting a straight line connecting two ends of the pressure release valve in a direction of the Y-axis on the hypothetical plane as viewed from an outer surface of the wall is referred to as a hypothetical line, a plane formed by reflecting the hypothetical line entirely over a dimension of the electrode assembly in the direction of the X-axis is referred to as a bottom plane, and a region surrounded by a plane connecting a contour of the bottom plane and a contour of the pressure release valve at a shortest distance is referred to as a three-dimensional region. The shielding member includes a shielding portion that partially covers a cross section of the three-dimensional region along the end face of the electrode assembly. The shielding member further includes a rib that contacts a portion in the inner surface of the wall surrounding the pressure release valve to space apart the shielding portion and the wall. The rib is projected toward the wall from an edge of the shielding portion extending in a direction of the Y-axis.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part passes through the three-dimensional region from any given location in the bottom plane and flows toward the ripped-open pressure release valve. The force of the generated gas scrapes parts of the electrodes and produces fragments. The shielding portion is located between the ripped-open pressure release valve and the cross section of the three-dimensional region and partially covers the cross-section. Thus, the gas discharged out of the electrode assembly from the cross section of the three-dimensional region strikes the shielding portion. This changes the direction of the gas flowing toward the pressure release valve and lengthens the gas discharge path extending toward the pressure release valve. As a result, the electrode fragments fall out of the gas. This limits the electrode fragments that are scattered out of the case from the ripped-open pressure release valve.

The rib may be projected from each of two edges of the shielding portion extending in the direction of the Y-axis.

Therefore, even if gas flows toward the pressure release valve from the two ends of the electrode assembly in the stacking direction (direction of the X-axis), the gas strikes the ribs and electrode fragments fall out of the gas. This limits the electrode fragments that are scattered out of the case from the ripped-open pressure release valve.

The shielding member may further include a rib projected toward the wall from the edge of the shielding portion extending in the direction of the X-axis.

Therefore, even if gas flows toward the pressure release valve in the direction of the Y-axis, the gas strikes the rib, and electrode fragments fall out of the gas. This limits the electrode fragments that are scattered out of the case from the ripped-open pressure release valve.

The rib projected from the edge of the shielding portion extending in the direction of the X-axis may include a gas passage hole.

Therefore, when the gas strikes the rib, electrode fragments fall out of the gas. The gas passes through the gas passage hole and is released out of the case from the ripped-open pressure release valve. That is, the gas passage hole functions to remove electrode fragments that becomes cause sparks. This limits electrode fragments that are scattered out of the case with the gas and avoids the generation of sparks.

The power storage apparatus may further include a reinforcement rib connected to the shielding portion and the rib.

Therefore, the reinforcement rib reinforces the shielding portion and the rib and obviates deformation of the shielding member when the gas strikes the shielding member.

Preferably, when viewing the shielding member from a side of the wall where the electrode assembly is located toward the inner surface of the wall, the rib exists within a plane defined by a contour of the shielding portion.

Therefore, the shielding member is free of a flange shaped to project from the outer surface of the rib to fix the shielding member to the wall. Compared to when a flange is used to fix the shielding member to the wall, the space between the end face of the electrode assembly and the wall can be widened so that the pressure in the case does not easily rise.

The shielding member may have the form of a box and include a center axis extending in a direction of the Y-axis. The shielding member includes a gas inlet provided in an opening at one axial end, a gas outlet open toward the pressure release valve in another axial end, and a path changing wall located in a gas path from the gas inlet to the gas outlet.

Therefore, the gas changed in direction when striking the shielding portion flows into the shielding member from the gas inlet. In the gas path from the gas inlet to the gas outlet, the gas is changed in flow direction by the path changing wall and strikes the wall surface of the shielding member. Then, the gas flows out of the shielding member from the gas outlet and is released out of the case from the pressure release valve.

Therefore, the arrangement of the path changing wall on the shielding member increases the number of times the gas strikes the shielding member so that the electrode fragments fall out of the gas. This limits the electrode fragments that are scattered out of the case with the gas and avoids the generation of sparks.

The electrodes having different polarities are a positive electrode and a negative electrode. The positive electrode and the negative electrode include a positive electrode tab and a negative electrode tab, respectively, and the positive electrode tab is shaped to project from the end face of the electrode assembly. The power storage apparatus further includes a positive electrode conductive member connected to the positive electrode tab and a negative electrode conductive member connected to the negative electrode tab. The positive electrode tab and the positive electrode conductive member may have a lower melting point than the negative electrode tab and the negative electrode conductive member. The positive electrode conductive member and the negative electrode conductive member are lined in a direction of the Y-axis. The shielding member may include a rib extending in the direction of the X-axis and located toward the positive electrode conductive member from the pressure release valve. A path of gas directed in a planar direction of the wall toward the pressure release valve from a side where the positive electrode conductive member is located defines a positive electrode side gas discharge path, and a path of the gas in the planar direction of the wall directed toward the pressure release valve from a side where the negative electrode conductive member is located defines a negative electrode side gas discharge path. A flow path resistance generated with respect to the gas in the positive electrode side gas discharge path may be greater than a flow path resistance generated with respect to the gas in the negative electrode side gas discharge path.

During the nail penetration test, when gas passes between the positive electrode tabs strike the positive electrode conductive member, part of at least one of the positive electrode tab and the positive electrode conductive member may be melted or scraped off by the high temperature high-pressure gas and be suspended in the gas. Even in such a case, the fragments of the positive electrode tab and the positive electrode conductive member discharged out of the case are limited because the gas strikes the rib. The flow path resistance of the positive electrode side gas discharge path is large. Thus, gas flows to the side where the negative electrode conductive member is located through the negative electrode side gas discharge path. The flow path resistance of the negative electrode side gas discharge path is smaller than the flow path resistance of the positive electrode side gas discharge path. Thus, the gas easily flows toward the pressure release valve. This limits increases in the pressure of the case.

The positive electrode side gas discharge path may have a flow path cross-sectional area smaller than that of the negative electrode side gas discharge path. Each gas discharge path is a path connecting the end face of the electrode assembly and the pressure release valve, and the difference is length between the paths is not large. Thus, the difference in the flow path cross-sectional area determines how easily gas flows. The flow-path cross-sectional area of the positive electrode side gas discharge path is smaller than the flow-path cross-sectional area of the negative electrode side gas discharge path. Thus, the gas easily flows to the negative electrode side gas discharge path.

The rib may include a projecting end projecting from the shielding portion toward the wall to a position beyond the positive electrode conductive member.

Therefore, during the nail penetration test, as gas passes between the positive electrode tabs and strike the positive electrode conductive member, even if the positive electrode conductive member is partially melted or scraped off by the high-temperature and high-pressure gas, the gas strikes the rib. This limits fragments that are discharged out of the case.

The projecting end of the rib may be spaced apart from the inner surface of the wall. Therefore, the gas from the side where the positive electrode conductive member is located is suitably discharged out of the case from the pressure release valve through the positive electrode side gas discharge path while setting the flow path resistance of the positive electrode side gas discharge path to be larger than the flow path resistance of the negative electrode side gas discharge path. This restricts excessive increases in the pressure rise of the case.

The power storage apparatus may include a movement restriction member that restricts movement of the shielding member in the direction of the Y-axis between the inner surface of the wall and the end face of the electrode assembly.

Therefore, the position of the shielding member can be maintained by the movement restriction member, and a state in which the cross section of the three-dimensional region is covered with the shielding portion can be maintained.

The movement restriction member that restricts movement of the shielding member toward the positive electrode conductive member may be the positive electrode conductive member, and the movement restriction member that restricts movement of the shielding member toward the negative electrode conductive member may be a tab group configured by gathering the negative electrode tabs in the direction of the X-axis.

Therefore, the movement of the shielding member can be restricted with the component existing in the case such as the positive electrode conductive member and the negative electrode tab group.

The movement restriction member that restricts movement of the shielding member toward the positive electrode conductive member is the positive electrode conductive member, and the movement restriction member that restricts movement of the shielding member toward the negative electrode conductive member is the negative electrode conductive member.

Thus, the movement of the shielding member can be restricted with components existing in the case such as the positive electrode conductive member and the negative electrode conductive member.

The positive electrode tab and the negative electrode tab may project from the end face of the electrode assembly and be spaced apart from each other in the direction of the Y-axis. The shielding member may include a baffle plate that overlaps the positive electrode tab and the negative electrode tab as viewed from an outer surface of the wall and covers the positive electrode tab and the negative electrode tab along the direction of the Y-axis.

Therefore, when gas is discharged from between tabs that are adjacent to each other in the stacking direction of the electrodes, the gas strikes the baffle plate so that electrode fragments fall out of the gas.

One of the positive electrode conductive member and the negative electrode conductive member may include an overlapping portion that overlaps the wall and the shielding portion as viewed from an outer surface of the wall.

Therefore, the gas generated during the nail penetration test is changed in direction when striking the shielding portion, passes between the two opposing surfaces of the overlapping portion of the conductive member of one the positive electrode conductive member and the negative electrode conductive member and the shielding portion, and flows toward the pressure release valve. As a result, the high temperature gas is less likely to contact the wall because of the overlapping portion.

The one of the conductive members includes a bent portion that is bent so that the overlapping portion is directed toward the pressure release valve.

Therefore, the gas generated during the nail penetration test is changed in direction when striking the shielding portion and passes between the opposing surfaces of the overlapping portion of the conductive member and the shielding portion toward the pressure release valve. The overlapping portion is shaped so that the bent portion extends toward the pressure release valve. Thus the gas flows along the overlapping portion toward the pressure release valve in a preferred manner.

A center position of the pressure release valve in the direction of the Y-axis may be closer to the negative electrode conductive member than a center position between the positive electrode tab and the negative electrode tab in the direction of the Y-axis.

During the nail penetration test, when gas passes between the positive electrode tabs and strike the positive electrode conductive member, at least one of the positive electrode tab and the positive electrode conductive member is partially melted or scraped off by the high-temperature high-pressure gas and suspended in the gas. Even in such a case, fragments of the positive electrode tab and the positive electrode conductive member are not discharged out of the case because the gas strikes the wall. Since the pressure release valve is closer to the negative electrode conductive member, the positive electrode gas discharge path is longer than the negative electrode side gas discharge path, and the flow path resistance of the positive electrode side gas discharge path increases. Thus, the gas flows to the side where the negative electrode conductive member is located and easily flows through the negative electrode side gas discharge path.

A gap may be formed between the positive electrode tab and the rib in the direction of the Y-axis. In this case, a gas striking member may cover the gap from a side of the wall where the gap is located.

Therefore, during the nail penetration test, the generated gas flows through a gap between the rib of the shielding member and the positive electrode tab. Thus, the positive electrode tab resists melting compared to when the gas flows between the positive electrode tabs. Furthermore, since the gas that flows through the gap strikes the gas striking member, fragments of the positive electrode tab and the positive electrode conductive member discharged out of the case are limited.

The shielding member may be spaced apart from an inner surface of the case.

Therefore, the shielding member causes electrode fragments to fall out of the gas without closing the pressure release valve and without inhibiting the operation of the pressure release valve.

The shielding member may be arranged on the end face of the electrode assembly.

Thus, the gas discharged out of the electrode assembly from the cross section of the three-dimensional region can immediately strike the shielding portion. The direction of the gas toward the pressure release valve is rapidly changed, and the gas discharge path toward the pressure release valve can be rapidly lengthened.

The shielding member may be made of metal. This limits melting of the shielding member that would be caused by the high-temperature high-pressure gas generated during the nail penetration test.

The shielding member may be heat resistant. For example, if the shielding member is made of metal, coating and the like of an insulating resin or ceramic would have to be performed on the surface of the shielding member so that the shielding member is not short-circuited with the case and the electrodes. In this respect, the heat resistance of the shielding member eliminates the need for coating the insulation.

The inner surface of the shielding member has a flat planar shape. Therefore, the gas generated during the nail penetration test easily flow toward the pressure release valve in the shielding member.

A power storage apparatus that solves the above problem includes an electrode assembly having a layered structure, an electrolytic solution, a case accommodating the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The power storage apparatus further includes a shielding member located closer to the electrode assembly than the pressure release valve. The shielding member includes a shielding portion, which covers the pressure release valve from a side of the wall where the electrode assembly is located, and a rib, which rises from the shielding portion toward the wall and includes a surface that intersects a gas path extending along a planar direction of the shielding portion.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part flows toward the ripped-open pressure release valve. The force of the generated gas scrapes parts of the electrodes and produces fragments. The shielding portion covers the ripped-open pressure release valve from the side of the wall where the electrode assembly is located. Thus, the gas discharged out of the electrode assembly strikes the shielding portion. This changes the direction of the gas flowing toward the pressure release valve and lengthens the gas discharge path extending toward the pressure release valve. Furthermore, the gas discharge path is lengthened as the gas flows along the rib. As a result, the electrode fragments fall out of the gas. This limits the electrode fragments that are scattered out of the case from the ripped-open pressure release valve.

A power storage apparatus that solves the above problem includes an electrode assembly having a layered structure, an electrolytic solution, a case accommodating the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The wall includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a point located in a center of the case in a front view of the case taken in a direction of the X-axis and located in a center of a dimension of the electrode assembly in the direction of the X-axis is referred to as a center point, and a region surrounded by a plane connecting the center point and a contour of the pressure release valve at a shortest distance is referred to as a three-dimensional region. The shielding member includes a shielding portion that entirely covers a cross section of the three-dimensional region along the end face of the electrode assembly.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part passes through the three-dimensional region from the center point and flows toward the ripped-open pressure release valve. The force of the generated gas scrapes parts of the electrodes and produces fragments. The shielding portion is located between the ripped-open pressure release valve and the cross section of the three-dimensional region and entirely covers the cross-section. Thus, the gas discharged out of the electrode assembly from the cross section of the three-dimensional region strikes the shielding portion. This changes the direction of the gas flowing toward the pressure release valve and lengthens the gas discharge path extending toward the pressure release valve. As a result, the electrode fragments fall out of the gas. This limits the electrode fragments that are scattered out of the case from the ripped-open pressure release valve.

The wall includes the shielding member. Thus, the scattering of electrode fragments out of the case from the ripped open pressure release valve is reduced without increasing the number of components of the power storage apparatus.

A power storage apparatus that solves the above problem includes an electrode assembly having a layered structure, an electrolytic solution, a case accommodating the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The wall includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a plane that passes through a center of the case in a front view of the case taken in the direction of the X-axis and is parallel to the end face of the electrode assembly is referred to as a hypothetical plane, a line reflecting a straight line connecting two ends of the pressure release valve in a direction of the Y-axis on the hypothetical plane as viewed from an outer surface of the wall is referred to as a hypothetical line, a plane formed by reflecting the hypothetical line entirely over a dimension of the electrode assembly in the direction of the X-axis is referred to as a bottom plane, a region surrounded by a plane connecting a contour of the bottom plane and a contour of the pressure release valve at a shortest distance is referred to as a three-dimensional region. The shielding member includes a shielding portion that entirely covers a cross section of the three-dimensional region along the end face of the electrode assembly.

Therefore, when the nail is pierced through the center of the case in a front view during the nail penetration test, the nail short-circuits the electrodes of different polarities. When short-circuiting occurs, heat is generated in the periphery of the short-circuited part. This decomposes the electrolytic solution component and generates gas. The generation of gas raises the pressure in the power storage apparatus. Then, when the internal pressure of the case reaches the release pressure of the pressure release valve, the pressure release valve is ripped open, and the gas in the case is released out of the case.

The high-pressure gas generated at the short-circuited part passes through the three-dimensional region from any given location in the bottom plane and flows toward the ripped-open pressure release valve. The force of the generated gas scrapes parts of the electrodes and produces fragments. The shielding portion is located between the ripped-open pressure release valve and the cross section of the three-dimensional region and partially covers the cross-section. Thus, the gas discharged out of the electrode assembly from the cross section of the three-dimensional region strikes the shielding portion. This changes the direction of the gas flowing toward the pressure release valve and lengthens the gas discharge path extending toward the pressure release valve. As a result, the electrode fragments fall out of the gas. This limits the electrode fragments that are scattered out of the case from the ripped-open pressure release valve.

Since the wall includes the shielding member, there is no increase in the number of components of the power storage apparatus, and the scattering of electrode fragments out of the case from the ripped open pressure release valve is reduced.

A power storage apparatus that solves the above problem includes an electrode assembly having a layered structure, an electrolytic solution, a case accommodating the electrode assembly and the electrolytic solution, and a pressure release valve that exists in a wall of the case. The electrode assembly includes electrodes that are insulated from each other and have different polarities. The pressure release valve is configured to be ripped open when a pressure in the case reaches a release pressure in order to release the pressure out of the case. The power storage apparatus includes a shielding member located between an inner surface of the wall and an end face of the electrode assembly facing the inner surface. An axis extending in a stacking direction of the electrodes is referred to as an X-axis, an axis orthogonal to the X-axis and parallel to the wall is referred to as a Y-axis, a line passing through a center of the case in a front view of the case taken in the direction of the X-axis and extending in the direction of the X-axis is referred to as a center line, a region surrounded by a plane connecting a moving point located at a given position on the center line and a contour of the pressure release valve at a shortest distance is referred to as a three-dimensional region, and an entire region in which the three-dimensional region moves when the moving point is moved over the entire dimension of the electrode assembly in the direction of the X-axis along the center line is referred to as a total three-dimensional region. The shielding member includes a shielding portion that entirely covers a cross section of the total three-dimensional region along the end face of the electrode assembly.

EMBODIMENTS OF THE INVENTION

First Embodiment

A first embodiment embodying a power storage apparatus in a rechargeable battery will now be described with reference to FIGS. 1 to 6.

Figure 1:
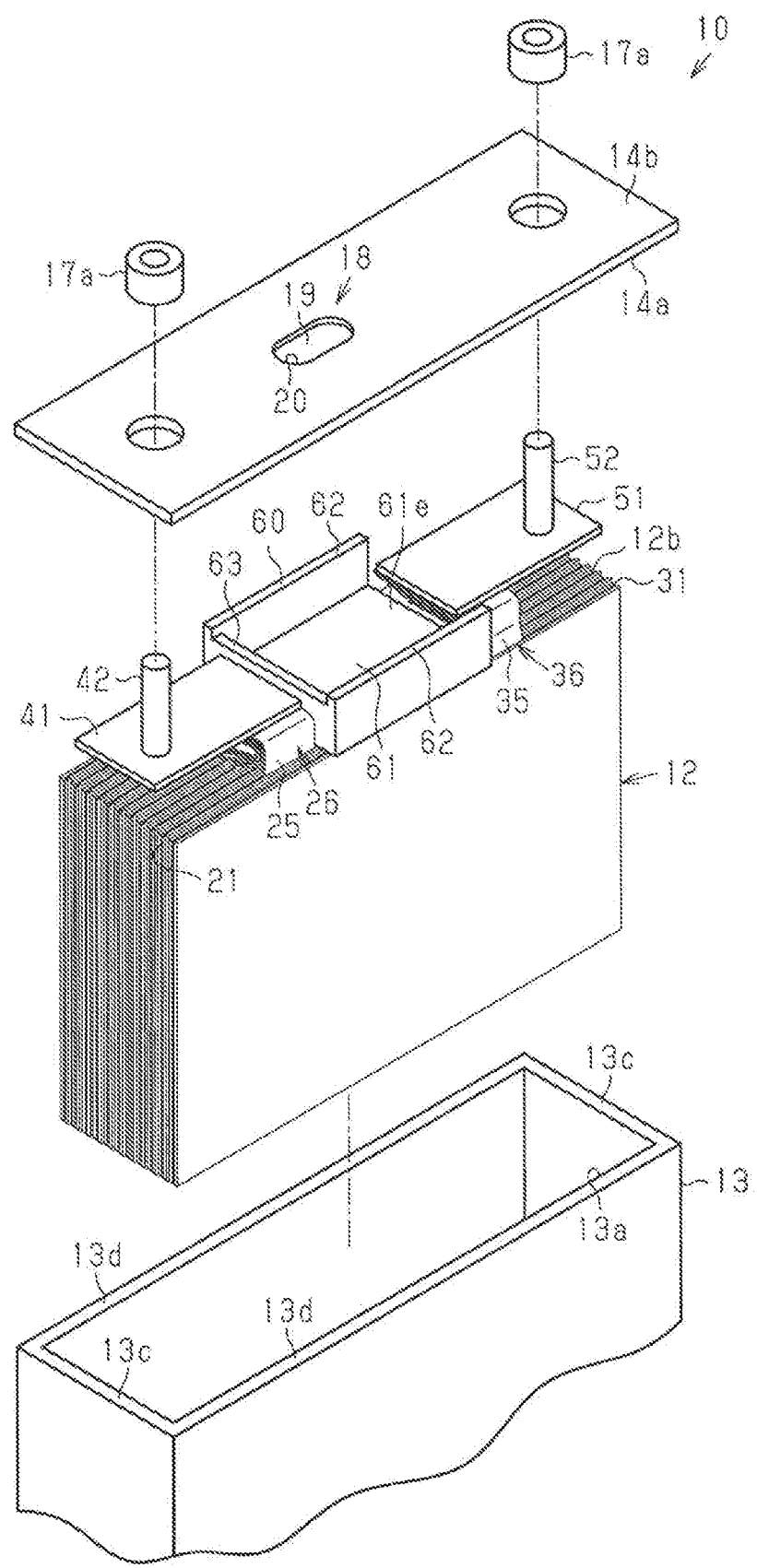
FIG. 1 is an exploded perspective view showing a rechargeable battery of a first embodiment.
Figure 2:
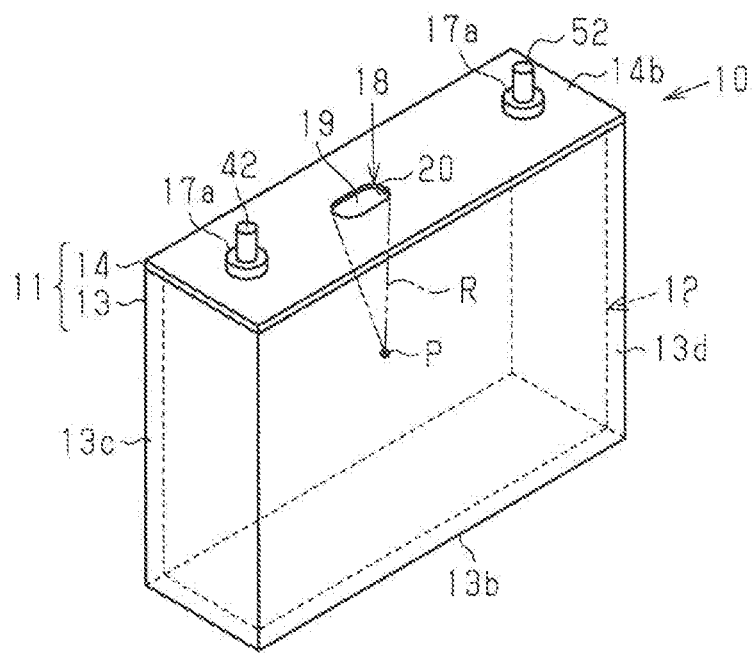
FIG. 2 is a perspective view showing the outside of the rechargeable battery of FIG. 1.

As shown in FIGS. 1 and 2, a rechargeable battery 10 serving as the power storage apparatus includes a case 11. The rechargeable battery 10 includes an electrode assembly 12 and electrolytic solution accommodated in the case 11. The case 11 includes a case main body 13, having an opening 13a, and a lid body 14, which closes the opening 13a of the case main body 13.

The case main body 13 and the lid body 14 are both made of aluminum. The case main body 13 includes a rectangular plate shaped bottom wall 13b, a short side wall 13c, which is shaped to project from a short side of the bottom wall 13b, and a long side wall 13d shaped to project from a long side of the bottom wall 13b. The case 11 has a cuboid shape, and the electrode assembly 12 also has a cuboid shape in conformance with the case 11. The rechargeable battery 10 is a prismatic lithium ion battery.

Figure 3:
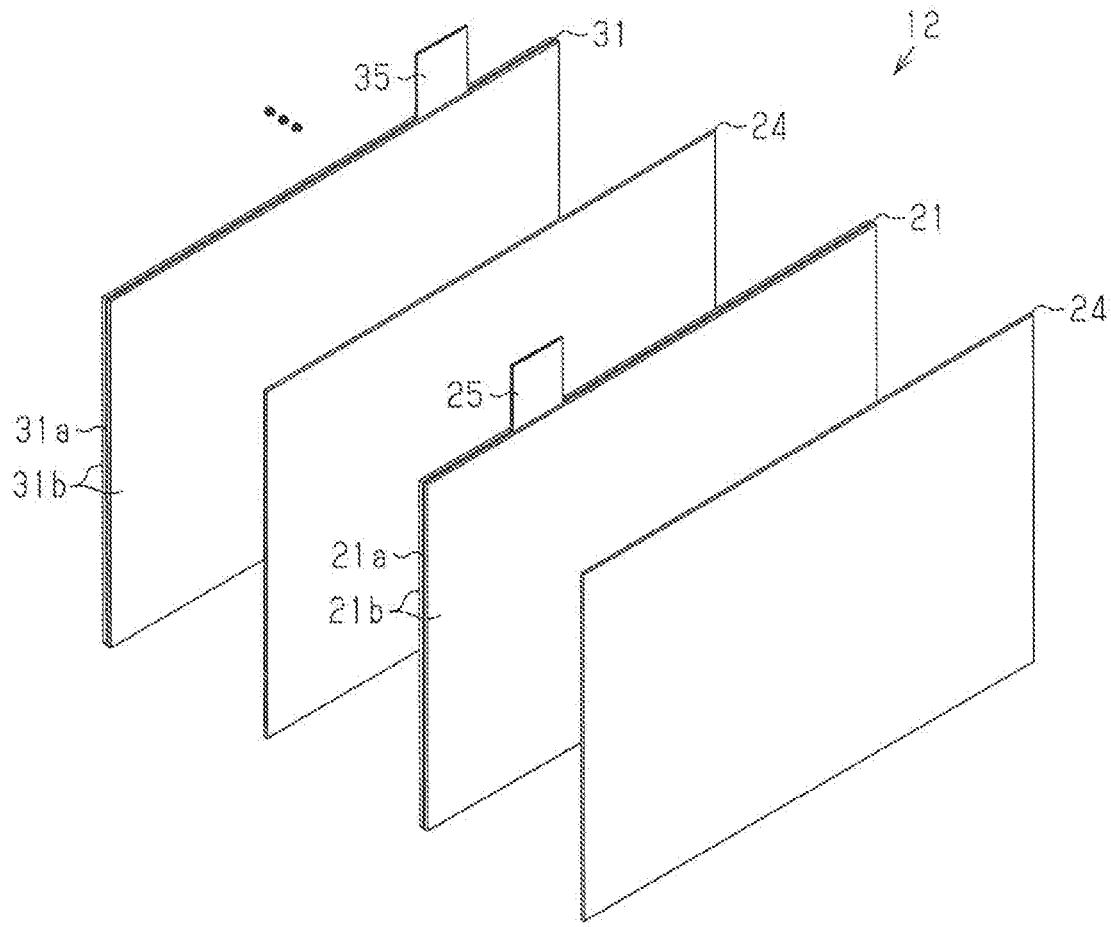
FIG. 3 is an exploded perspective view showing elements of an electrode assembly in the rechargeable battery of FIG. 1.

As shown in FIG. 3, the electrode assembly 12 includes a plurality of positive electrodes 21 having a rectangular sheet shape, and a plurality of negative electrodes 31 having a rectangular sheet shape. The positive electrode 21 and the negative electrode 31 are electrodes of different polarity. The positive electrode 21 includes a positive electrode metal foil (aluminum foil in the present embodiment) 21a, and a positive electrode active material layer 21b existing on both surfaces of the positive electrode metal foil 21a. The negative electrode 31 includes a negative electrode metal foil (copper foil in the present embodiment) 31a and a negative electrode active material layer 31b existing on both surfaces of the negative electrode metal foil 31a. The electrode assembly 12 is a stacked type in which a separator 24 is located between the plurality of positive electrodes 21 and the plurality of negative electrodes 31 to obtain a layered structure. The separator 24 insulates the positive electrode 21 and the negative electrode 31. The stacking direction of the electrodes 21, 31 in the electrode assembly 12 is a short-side direction of the lid body 14 in the case 11. An axis extending in the stacking direction of the electrodes 21, 31 is referred to as an X-axis, and an axis orthogonal to the X-axis and parallel to the lid body 14 (specifically, outer surface and inner surface of the lid body 14) is referred to as a Y-axis. Thus, the short-side direction of the lid body 14 is a direction of the X-axis, and the longitudinal direction of the lid body 14 is a direction of the Y-axis.

The positive electrode 21 includes a tab 25 shaped to project from a part of one side of the positive electrode 21. The negative electrode 31 includes a tab 35 shaped to project from a part of one side of the negative electrode 31. The positive electrode tabs 25 do not overlap the negative electrode tabs 35 in a state in which the positive electrodes 21 and the negative electrodes 31 are stacked. The electrode assembly 12 includes a tab-side end face 12b. The tabs 25, 35 are shaped to project from the tab-side end face 12b. Therefore, the tab 25 of the positive electrode 21 is a part of the positive electrode metal foil 21a, and the tab 35 of the negative electrode 31 is a part of the negative electrode metal foil 31a. Furthermore, the positive electrode metal foil 21a has a lower melting point than the negative electrode metal foil 31a.

As shown in FIG. 1, the rechargeable battery 10 includes the positive electrode tab group 26 shaped to project from the tab-side end face 12b. The positive electrode tab group 26 is configured by gathering and stacking all the positive electrode tabs 25 at one end side in the stacking direction of the electrode assembly 12. The rechargeable battery 10 includes a negative electrode tab group 36 shaped to project from the tab-side end face 12b. The negative electrode tab group 36 is configured by gathering and stacking all the negative electrode tabs 35 at one end side in the stacking direction of the electrode assembly 12.

The rechargeable battery 10 includes a positive electrode conductive member 41. The positive electrode conductive member 41 is made of a material same as the positive electrode metal foil 21a and is made of aluminum in the present embodiment. The positive electrode conductive member 41 has a rectangular plate shape in which a long side is extended in the longitudinal direction of the lid body 14. The positive electrode tab group 26 is joined with one longitudinal end of the positive electrode conductive member 41. The positive electrode terminal 42 is joined with the other longitudinal end of the positive electrode conductive member 41.

The rechargeable battery 10 includes a negative electrode conductive member 51. The negative electrode conductive member 51 is made of a material same as the negative electrode metal foil 31a and is made of copper in the present embodiment. Thus, the positive electrode conductive member 41 has a lower melting point than the negative electrode conductive member 51. The negative electrode conductive member 51 has a rectangular plate shape in which a long side is extended in the longitudinal direction of the lid body 14. The negative electrode tab group 36 is joined with one longitudinal end of the negative electrode conductive member 51. The negative electrode terminal 52 is joined with the other longitudinal end of the negative electrode conductive member 51. The positive electrode conductive member 41 and the negative electrode conductive member 51 are located between an inner surface 14a of the lid body 14 and the tab-side end face 12b of the electrode assembly 12 facing the inner surface 14a.

The positive electrode conductive member 41 and the negative electrode conductive member 51 are spaced apart in the longitudinal direction of the lid body 14. The positive electrode terminal 42 and the negative electrode terminal 52 extend through the lid body 14 and are partially exposed to the outside of the case 11. Furthermore, a ring-shaped insulating member 17a for insulation from the case 11 is attached to the positive electrode terminal 42 and the negative electrode terminal 52.

The rechargeable battery 10 includes the pressure release valve 18 on the lid body 14 serving as a wall. The pressure release valve 18 is ripped open when the pressure in the case 11 reaches a release pressure, which is a predetermined pressure. When the pressure release valve 18 is ripped open, the pressure in the case 11 is released out of the case 11.

The release pressure of the pressure release valve 18 is set to a pressure at which the pressure release valve is be ripped open before the case 11 or a joining portion of the case main body 13 and the lid body 14 cracks or breaks. The pressure release valve 18 includes a thin plate-shaped valve body 19 that is thinner than the lid body 14. The valve body 19 is located at the bottom of a recess 20 provided in a recessed manner in the outer surface 14b of the lid body 14 of the surfaces of the lid body 14 and molded integrally with the lid body 14.

Figure 5:
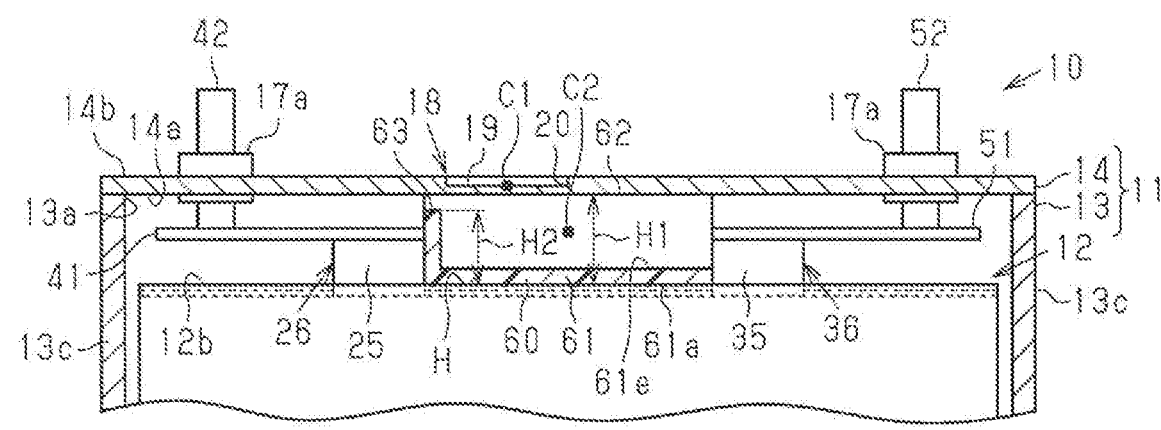
FIG. 5 is a partial cross-sectional view showing an internal structure of the rechargeable battery of FIG. 1.

The pressure release valve 18 is located closer to the positive electrode terminal 42 than a longitudinally center part of the lid body 14. The pressure release valve 18 is located at the center in the short-side direction of the lid body 14. As shown in FIG. 5, a center position C1 of the pressure release valve 18 is located closer to the positive electrode conductive member 41 than a center position C2 between the tab 25 (tab group 26) of the positive electrode 21 and the tab 35 (tab group 36) of the negative electrode 31 in the longitudinal direction of the lid body 14. The pressure release valve 18 has the form of an elongated hole in a view taken from the outer surface 14b of the lid body 14.

Figure 4:
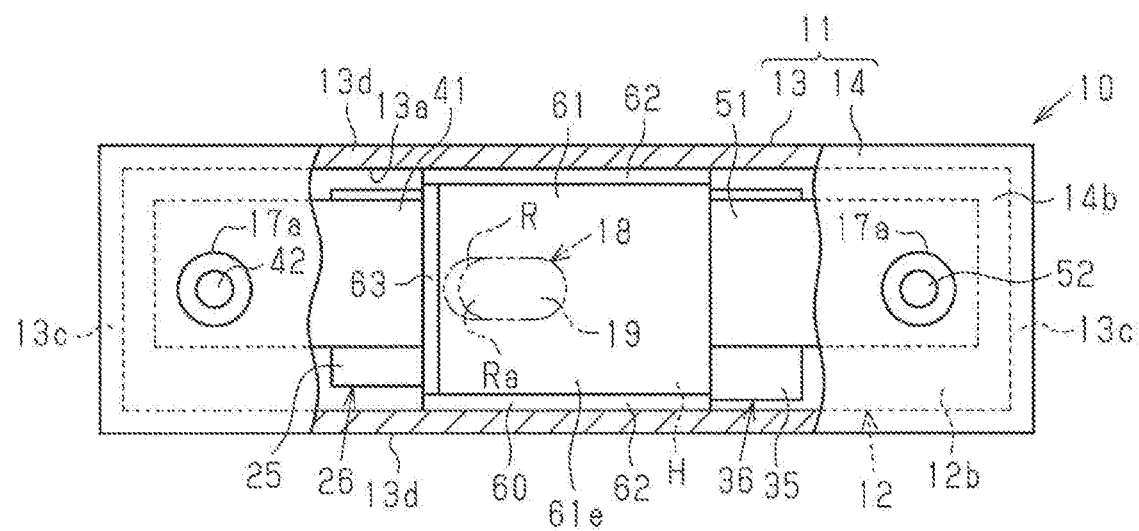
FIG. 4 is a plan view showing the rechargeable battery of FIG. 1.

As shown in FIG. 1, 4, or 5, the rechargeable battery 10 includes a shielding member 60. The shielding member 60 is located between the positive electrode conductive member 41 and the negative electrode conductive member 51 in the longitudinal direction of the lid body 14. Furthermore, the shielding member 60 is located between the inner surface 14a of the lid body 14 and the tab-side end face 12b and is mounted on the tab-side end face 12b. The shielding member 60 is not fixed to the inner surface 14a of the lid body 14 and the tab-side end face 12b and is slightly movable between the lid body 14 and the electrode assembly 12. The shielding member 60 is made of synthetic resin, and for example, is preferably made of a heat resistant resin such as polyimide. Thus, the shielding member 60 does not short circuit the member of the positive electrode potential and the member of the negative electrode potential in the case 11.

The shielding member 60 includes a rectangular plate-shaped shielding portion 61. The long side of the shielding portion 61 is extended in the longitudinal direction of the lid body 14. The shielding member 60 includes first ribs 62 shaped to project from a pair of long edges of the shielding portion 61 toward the lid body 14. Each first rib 62 is shaped so that the long side is extended in the longitudinal direction of the lid body 14. The shielding member 60 includes a second rib 63. The second rib 63 is shaped to project from a short edge closer to the positive electrode conductive member 41 of a pair of short edges of the shielding portion 61 toward the lid body 14. The pair of first ribs 62 is coupled to the second rib 63.

An outer surface of the second rib 63 contacts one longitudinal end face the positive electrode conductive member 41. An end face of the shielding portion 61 is in contact with a side surface of the negative electrode tab group 36. The shielding member 60 immediately contacts with the positive electrode conductive member 41 or the negative electrode tab group 36 when slightly moved in the longitudinal direction of the lid body 14. Thus, the shielding member 60 restricts movement of the lid body 14 in the longitudinal direction. Therefore, the positive electrode conductive member 41 and the negative electrode tab group 36 function as a movement restriction member that restricts the movement of the shielding member 60 in the longitudinal direction of the lid body 14.

The outer surface of one first rib 62 is in contact with the inner surface of one long side wall 13d of the case main body 13, and the outer surface of the other first rib 62 is in contact with the inner surface of the other long side wall 13d. The shielding member 60 is spaced apart from the inner surface of each long side wall 13d, which is the inner surface of the case 11. However, when slightly moved in the short-side direction of the lid body 14, the shielding member 60 immediately contacts one of the long side walls 13d. Thus, the shielding member 60 restricts movement of the lid body 14 in the short-side direction. Therefore, the shielding member 60 also restricts movement in both directions along the tab-side end face 12b.

The shielding member 60 exists between the positive electrode conductive member 41 and the negative electrode conductive member 51 in the longitudinal direction of the lid body 14. A portion that is a central portion in the longitudinal direction of the tab-side end face 12b and surrounded by the positive electrode conductive member 41, the negative electrode conductive member 51, and the pair of long side walls 13d is referred to as a covering region H. The covering region H is covered by the shielding member 60. An extending direction of a straight line connecting the inner surface 14a of the lid body 14 and the bottom surface of the case main body 13 at a shortest distance is referred to as a height-wise direction. In the shielding member 60, a surface mounted on the tab-side end face 12b in the shielding portion 61 is referred to as an outer surface 61a, and a surface facing the inner surface 14a of the lid body 14 is referred to as an inner surface 61e.

As shown in FIG. 5, in the shielding member 60, among the dimensions in the projecting direction of the first rib 62 from the shielding portion 61, a dimension of the first rib 62 from the outer surface 61a of the shielding portion 61 is referred to as a projecting distance H1. In the shielding member 60, among the dimensions in the projecting direction of the second rib 63 from the shielding portion 61, a dimension from the outer surface 61a of the shielding portion 61 is referred to as an projecting distance H2. The projecting distance H2 of the second rib 63 is shorter than the projecting distance H1 of the first rib 62. Thus, a projecting end from the shielding portion 61 of the first rib 62 is located at a position substantially contacting the inner surface 14a of the lid body 14. A projecting end from the shielding portion 61 of the second rib 63 is spaced apart from the inner surface 14a of the lid body 14. This is to obtain a flow path so that the gas generated during the nail penetration test conducted on the rechargeable battery 10 flows toward the pressure release valve 18 from a side where the positive electrode conductive member 41 is located. The projecting end from the shielding portion 61 of the second rib 63 is located at a position closer to the lid body 14 than the positive electrode conductive member 41. That is, the position of the projecting end of the second rib 63 is located beyond the positive electrode conductive member 41 toward the lid body 14.

As shown in FIG. 4, with regard the shielding member 60 mounted on the tab-side end face 12b, in the short-side direction of the lid body 14 of the location surrounding the pressure release valve 18 in the inner surface 14a of the lid body 14, the pair of first ribs 62 can contact the outer side of the pressure release valve 18. The second rib 63 is located on the outer side closer to the positive electrode conductive member 41 than the pressure release valve 18 in the longitudinal direction of the lid body 14. Thus, the first rib 62 and the second rib 63 are at positions not overlapping the pressure release valve 18 in a view of the lid body 14 taken from the outer surface 14b. When the rechargeable battery 10 is vibrated and the electrode assembly 12 is moved toward the lid body 14, the shielding member 60 is also moved toward the lid body 14, and the first rib 62 is in contact with the inner surface 14a of the lid body 14. The shielding portion 61 and the lid body 14 are separated by the contact. Thus, in the present embodiment, the first rib 62 configures a spacer of the shielding member 60.

When viewing the shielding member 60 from the side of the lid body 14 where the electrode assembly 12 is located toward the inner surface 14a, the first ribs 62 and the second rib 63 exist within a plane defined by a contour of the shielding portion 61. That is, the shielding member 60 does not have a flange shaped to project from the outer surface of each rib 62, 63 to fix the shielding member 60 to the lid body 14, and the outer surface of each rib 62, 63 has a flat planar shape.

Figure 6:
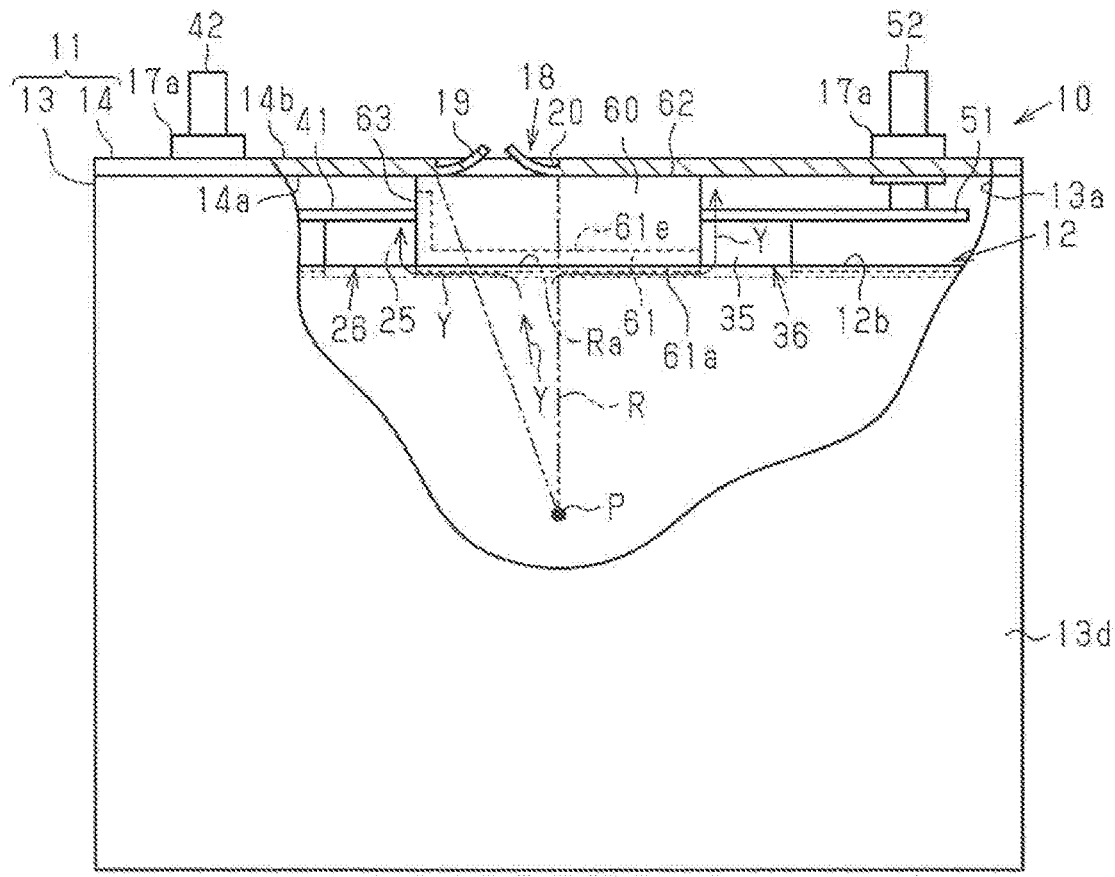
FIG. 6 is a partially cutaway front view showing the rechargeable battery of FIG. 1 during a nail penetration test.

As shown in FIGS. 2 and 6, in the front view of the case 11, the position where two diagonal lines intersect is referred to as a center of the case 11 in the front view. A point located at the center of the case 11 in the front view and located at the center of the electrode assembly 12 in the stacking direction of the electrodes 21, 31 is referred to as a center point P. A region surround by a plane connecting the center point P and the contour of the valve body 19 in the pressure release valve 18 at a shortest distance is referred to as a three-dimensional region R.

The three-dimensional region R is a region surrounded by the center point P, the surface of the valve body 19 in the pressure release valve 18, and the plane connecting the center point P and the surface of the valve body 19. The three-dimensional region R is shaped to narrow from the pressure release valve 18 toward the center point P and resembles a cone. The pressure release valve 18 is located closer to the positive electrode terminal 42 in the longitudinal direction of the lid body 14. Thus, the three-dimensional region R is shaped to incline toward the positive electrode terminal 42 in the longitudinal direction of the lid body 14.

As shown in FIGS. 4 and 6, a cross section along the tab-side end face 12b is referred to as a cross section Ra in the three-dimensional region R. In the cross section Ra, a dimension in the longitudinal direction of the lid body 14 is slightly smaller than the valve body 19. The cross section Ra of the three-dimensional region R exists in the covering region H of the tab-side end face 12b. The cross section Ra existing on the tab-side end face 12b is entirely covered by the outer surface 61a of the shielding portion 61 mounted on the tab-side end face 12b.

The operation of the rechargeable battery 10 will now be described.

As shown in FIG. 6, when a nail is penetrated through the center of the case 11 in a front view of the rechargeable battery 10 to conduct the nail penetration test, the nail extends through the electrode assembly 12 in the stacking direction. The separator 24 between the positive electrode 21 and the negative electrode 31 is thus broken or melted by the nail, and the positive electrode 21 and the negative electrode 31 are short-circuited in the case 11.

When short-circuiting occurs in the electrode assembly 12, heat is generated in the periphery of the short-circuited part. This decomposes the electrolytic solution component and generates gas. The generation of gas raises the pressure in the rechargeable battery 10. When the internal pressure of the case 11 reaches the release pressure of the pressure release valve 18, the valve body 19 of the pressure release valve 18 is ripped open, and the gas in the case 11 is released out of the case 11.

The high-pressure gas generated at the center point P of the short-circuited part passes through the three-dimensional region R toward the ripped-open pressure release valve 18 and rises, as shown by arrow Y. Part of each of the electrodes 21, 31 and each of the metal foils 21a, 31a is scraped into fragments by the force of the generated gas. The gas flows toward the pressure release valve 18 and is discharged out of the electrode assembly 12 from the cross section Ra of the three-dimensional region R of the covering region H of the tab-side end face 12b. The gas then strikes the outer surface 61a of the shielding portion 61 covering the cross section Ra of the three-dimensional region R and is changed in direction along the outer surface 61a.

The gas changed in direction when striking the shielding portion 61 rises along the first rib 62 and the second rib 63 and passes through a gap between the distal end face of the each rib 62, 63 and the inner surface 14a of the lid body 14 to the pressure release valve 18. Furthermore, the gas that passes between the tabs 25 of the positive electrode tab group 26 flows on the inner surface 61e of the shielding portion 61 from the side where the positive electrode conductive member 41 is located to reach the pressure release valve 18. The gas passes between the tabs 35 of the negative electrode tab group 36 and flows on the inner surface 61e of the shielding portion 61 from the side where the negative electrode conductive member 51 is located to reach the pressure release valve 18. Thus, the gas flows from any given place in the periphery of the pressure release valve 18 toward the pressure release valve 18 in the interior of the shielding member 60. Therefore, the gas path also exists at any given position along the inner surface 61*e* of the shielding portion 61. In the present embodiment, the outer surface of each of the first ribs 62 is a surface orthogonal to the gas path toward the pressure release valve 18 along the short-side direction of the lid body 14, and the outer surface of the second rib 63 is a surface orthogonal to the gas path toward the pressure release valve 18 in the longitudinal direction of the lid body 14.

A direction in which the gas is directed toward the pressure release valve 18 in the longitudinal direction and the planar direction of the lid body 14 is referred to as a gas discharging direction. The gas generated during the nail penetration test flows through a positive electrode side gas discharge path toward the pressure release valve 18 beyond the second rib 63 on the side where the positive electrode conductive member 41 is located. The gas flows through a negative electrode side gas discharge path toward the pressure release valve 18 from the side the negative electrode conductive member 51 is located.

In this case, the gas flowing through the positive electrode side gas discharge path passes through a flow path surrounded by the pair of first ribs 62, the second rib 63, and the lid body 14 and flows toward the pressure release valve 18 from the side where the positive electrode conductive member 41 is located.

The gas flowing through the negative electrode side gas discharge path passes through a flow path surrounded by the pair of first ribs 62, the shielding portion 61, and the lid body 14 and flows toward the pressure release valve 18 from the side where the negative electrode conductive member 51 is located. Then, the gas is discharged out of the case 11 from the ripped-open pressure release valve 18. The flow path resistance of the positive electrode side gas discharge path in which the second rib 63 is proximate to the positive electrode conductive member 41 is greater than the flow path resistance of the negative electrode side gas discharge path in which the second rib 63 does not exist. That is, a flow path cross-sectional area of the positive electrode side gas discharge path is smaller than a flow path cross-sectional area of the negative electrode side gas discharge path. Therefore, in the two gas discharge paths, the gas flows more easily through the negative electrode side gas discharge path than the positive electrode side gas discharge path.

The embodiment described above has the following advantages.

(1) The shielding portion 61 of the shielding member 60 entirely covers the cross section Ra located on the tab-side end face 12*b* of the three-dimensional region R connecting the center point P existing in the short-circuited part and the pressure release valve 18. Thus, during the nail penetration test, the gas flows toward the pressure release valve 18 and strikes the outer surface 61*a* of the shielding portion 61, and the flowing direction of the gas is deviated from the path headed straightly toward the pressure release valve 18 to lengthen the gas discharge path toward the pressure release valve 18. As a result, the fragments of the electrodes 21, 31 and the metal foils 21*a*, 31*a* fall out of the gas fall into the case 11. This reduces the fragments scattered out of the case 11 by the gas and limits the generation of sparks.

(2) The first ribs 62 of the shielding member 60 are in contact with the inner surface 14*a* of the lid body 14 to keep the shielding portion 61 and the lid body 14 spaced apart from each other and maintain an interval between the two surfaces. Thus, even though the shielding member 60 is mounted on the tab-side end face 12*b*, the flow path of the gas is ensured, and the function of the pressure release valve 18 for discharging gas out of the case 11 is maintained.

(3) The pair of first ribs 62 of the shielding member 60 contacts the outer side of the pressure release valve 18 in the short-side direction of the inner surface 14*a* of the lid body 14. Thus, the first rib 62 does not block the pressure release valve 18.

(4) The first rib 62 of the shielding member 60 is located at the outer side of the pressure release valve 18 in the short-side direction of the lid body 14. During the nail penetration test, the electrode assembly 12 is expanded in the stacking direction as the temperature rises, and the gas flows toward the pressure release valve 18 from the two sides in the stacking direction of the electrode assembly 12. Such gas strikes the first rib 62, and fragments of each of the electrodes 21, 31 and each of the metal foil 21*a*, 31*a* fall from the gas.

(5) The shielding member 60 includes the second rib 63 extending in the short-side direction of the lid body 14. Thus, even if the gas flows to the shielding member 60 from the side where the positive electrode conductive member 41 is located, the gas strikes the second rib 63 so that fragments of each of the electrodes 21, 31 and each of the metal foils 21*a*, 31*a* fall out.

(6) The second rib 63 is located toward the positive electrode conductive member 41 from the pressure release valve 18 in the shielding member 60. Thus, parts of the positive electrode conductive member 41 and the tab 25 made of aluminum are melted or scraped off by the high temperature high-pressure gas will strike the second rib 63 not be discharged from of the case 11.

(7) The shielding member 60 is mounted on the tab-side end face 12*b* with the outer surface of each first rib 62 spaced apart from the inner surface of the long side wall 13*d*. Thus, the shielding member 60 does not block the pressure release valve 18 while causing fragments of each of the electrodes 21, 31 and each of the metal foils 21*a*, 31*a* to fall out of the gas into the case 11 without inhibiting the operation of the pressure release valve 18.

(8) The shielding member 60 is mounted on the tab-side end face 12*b*. Thus, the gas discharged out of the electrode assembly 12 from the cross section Ra of the tab-side end face 12*b* immediately strikes the shielding portion 61. Consequently, the direction of the gas flowing toward the pressure release valve 18 is rapidly changed, and the gas discharge path toward the pressure release valve 18 is rapidly lengthened.

(9) The shielding member 60 is made of heat resistant resin. Thus, the shielding member 60 is not melted by the high temperature gas generated during the nail penetration test.

(10) The shielding member 60 includes a pair of first ribs 62 rising from the shielding portion 61. Thus, even if the rechargeable battery 10 is vibrated and the electrode assembly 12 is moved toward the lid body 14, the shielding member 60 moves toward the lid body 14 so that the first ribs 62 come into contact with the lid body 14. Thus, the electrode assembly 12 does not hit the lid body 14, and damage of the electrode assembly 12 is avoided.

(11) The shielding member 60 includes the second rib 63. Thus, during the nail penetration test, even if parts of the tab 25 made of aluminum or part of the positive electrode conductive member 41 is melted or scraped off by the high temperature high-pressure gas when the gas striking the shielding portion 61 passes between the tab groups 26 on the positive electrode side or when the gas flows along the positive electrode conductive member 41, such parts strike the second rib 63 and are not discharged out of the case 11.

The flow path resistance of the positive electrode side gas discharge path proximate to the positive electrode conductive member 41 is greater than the flow path resistance of the negative electrode side gas discharge path proximate to the negative electrode conductive member 51 because of the arrangement of the second rib 63. In other words, a flow path cross-sectional area of the positive electrode side gas discharge path is smaller than a flow path cross-sectional area of the negative electrode side gas discharge path. Thus, since the flow path resistance of the positive electrode side gas discharge path is greater (flow path cross-sectional area is smaller), gas easily flows to the side where the negative electrode conductive member 51 is located. Furthermore, since the flow path cross-sectional area of the negative electrode side gas discharge path is greater than the flow path cross-sectional area of the positive electrode side gas discharge path, gas easily flows from the negative electrode side gas discharge path toward the pressure release valve 18, and the pressure in the case 11 does not rise.

(12) The projecting end from the shielding portion 61 of the second rib 63 is located at a position closer to the lid body 14 than the positive electrode conductive member 41. Thus, during the nail penetration test, even if the gas passes between the tab groups 26 on the positive electrode side and strikes the positive electrode conductive member 41 and even if part of the positive electrode conductive member 41 made of aluminum is melted and scraped off by the high temperature high-pressure gas, the gas strikes the second rib 63 and fragments of the positive electrode conductive member 41 are not discharged out of the case 11 by the second rib 63.

The projecting end from the shielding portion 61 of the second rib 63 is spaced apart from the inner surface 14a of the lid body 14. Thus, the path of the gas flowing toward the pressure release valve 18 along the positive electrode conductive member 41 is ensured, and the gas from the side where the positive electrode conductive member 41 is located is discharged out of the case 11 from the pressure release valve 18. This limits excessive pressure rises in the case 11.

(13) The shielding member 60 is made of a heat resistant resin. For example, if the shielding member 60 is made of metal, the surface of the shielding member 60 need to be coated with an insulating resin or ceramic. However, the shielding member that is made of a heat resistant resin eliminates the need for such coating.

(14) The tab 25 of the positive electrode 21 is part of the positive electrode metal foil 21a, and the tab 35 of the negative electrode 31 is part of the negative electrode metal foil 31a. Thus, when the positive electrode 21 and the negative electrode 31 are stacked, a space for arranging the shielding member 60 is obtained between the tab group 26, in which the tabs 25 of the positive electrodes 21 are stacked, and the tab group 36, in which the tabs 35 of the negative electrode 31 are stacked. For example, when the tabs are separate from each of the electrodes 21, 31, the space between the tabs will vary in size and not allow for the arrangement of the shielding member 60.

(15) The first rib 62 of the shielding member 60A does not include a hole extending in the thickness-wise direction. Thus, compared to when a hole is included, the rigidity of the first rib 62 is increased. Even if the shielding member 60 is moved toward the lid body 14 by the gas generated during the nail penetration test and the first rib 62 hits the lid body 14, deformation of the first rib 62 is limited.

(16) When viewing the shielding member 60 from the side where the electrode assembly 12 is located toward the inner surface 14a of the lid body 14, the first rib 62 and the second rib 63 exist inside a plane defined by the contour of the shielding portion 61. Thus, the shielding member 60 does not have a flange shaped to project from the outer surface of each rib 62, 63 to fix the shielding member 60 to the lid body 14. Therefore, the space between the tab-side end face 12b and the lid body 14 can be widened compared to a case in which a flange is provided to fix the shielding member 60 to the lid body 14.

(17) The outer surface of the second rib 63 can contact one longitudinal end face of the positive electrode conductive member 41. The end face of the shielding portion 61 can contact the side surface of the negative electrode tab group 36 in the folded state. Thus, the movement of the shielding member 60 in the longitudinal direction of the lid body 14 is restricted by the positive electrode conductive member 41 and the negative electrode tab group 36. This maintains a state in which the cross section Ra located on the tab-side end face 12b is entirely covered by the shielding member 60.

(18) The inner surface 61e of the shielding member 60 has a flat planar shape. Thus, the gas generated during the nail penetration test easily flows toward the pressure release valve 18 inside the shielding member 60.

Second Embodiment

Figure 7:
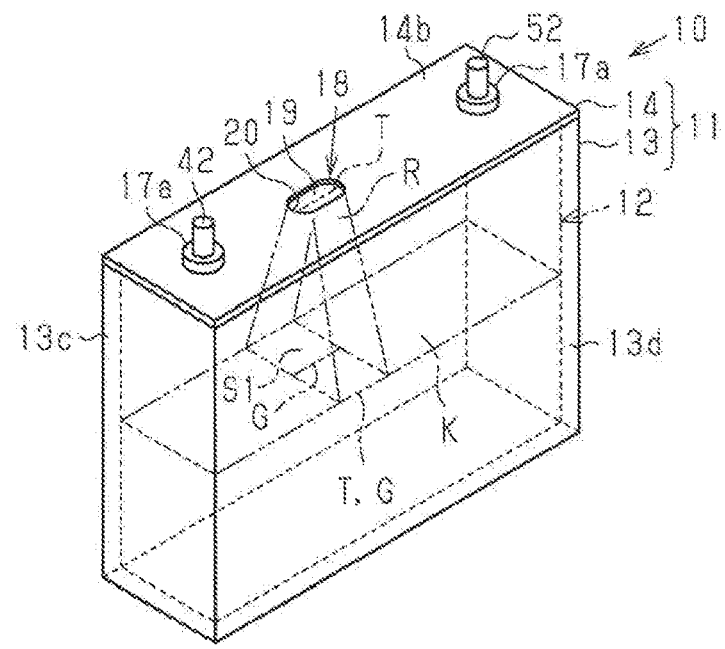
FIG. 7 is a perspective view showing a rechargeable battery of a second embodiment.

A second embodiment embodying a power storage apparatus in a rechargeable battery will now be described with reference to FIGS. 7 and 8. In the second embodiment, components that are the same as the first embodiment will not be described in detail.

The three-dimensional region R is set as described below. As shown in FIG. 7, a plane that passes through the center of the case 11 in a front view of the case 11 taken in the stacking direction of the electrode assembly 12 and is parallel to the tab-side end face 12b of the electrode assembly 12 is referred to as a hypothetical plane K.

A straight line connecting both ends of the pressure release valve 18 in the longitudinal direction of the lid body 14 is referred to as a hypothetical line T. A side (line) in which the hypothetical line T is reflected on the hypothetical plane K when viewed from the outer surface 14b of the lid body 14 is referred to as a hypothetical side (hypothetical line) G. A plane formed by reflecting the hypothetical side G over the entire dimension of the electrode assembly 12 in the stacking direction is referred to as a bottom plane S1. The bottom plane S1 has a rectangular shape including one side defined by the hypothetical side G and another side passing through one end of the hypothetical side G and extending in the stacking direction.

The three-dimensional region R is a region surrounded by a plane connecting the contour of the bottom plane S1 and the contour of the valve body 19 of the pressure release valve 18 at a shortest distance. The three-dimensional region R of the second embodiment is a region surrounded by the bottom plane S1, the surface of the valve body 19 in the pressure release valve 18, and the planes connecting the bottom plane S1 and the surface of the valve body 19. The three-dimensional region R of the second embodiment has the form of a truncated quadrangular cone. In the three-dimensional region R, the dimension along the short-side direction of the lid body 14 gradually increases from the valve body 19 toward the bottom plane S1.

Figure 8:
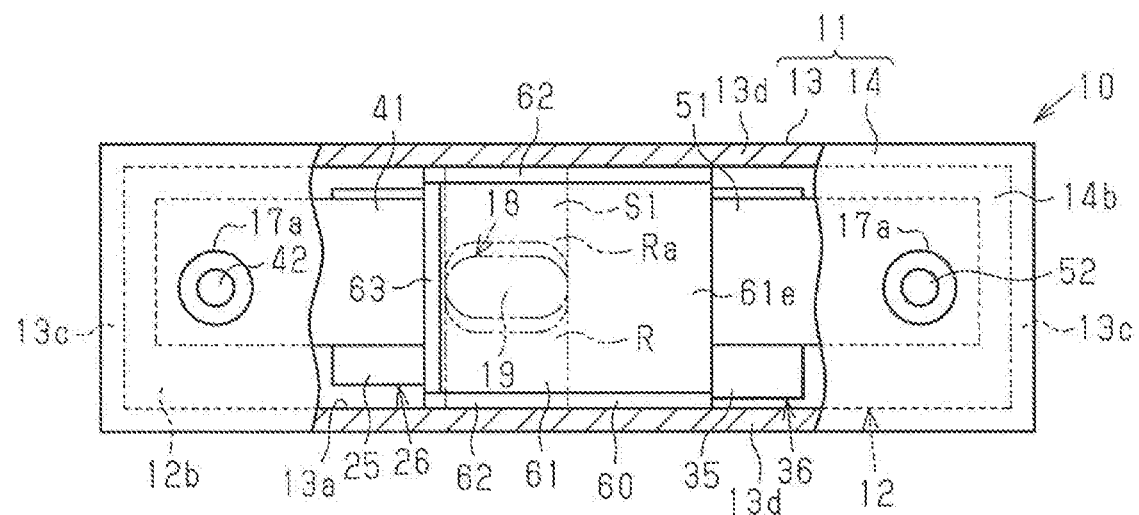
FIG. 8 is a plan view showing the rechargeable battery of FIG. 7.

As shown in FIG. 8, the three-dimensional region R includes the cross section Ra that lies along the tab-side end face 12b. In the cross section Ra, a dimension of the lid body 14 in the short-side direction is greater than that of the valve body 19. Furthermore, the cross section Ra of the three-dimensional region R is entirely covered by the outer surface 61a of the shielding portion 61 of the shielding member 60 mounted on the tab-side end face 12b.

Therefore, the second embodiment has the following advantage in addition to the advantages of the first embodiment.

(19) In the second embodiment, during the nail penetration test, even if gas is generated from any location in the bottom plane S1, the gas passes through the three-dimensional region R toward the pressure release valve 18. The shielding member 60 is located at a position covering the entire cross section Ra of the three-dimensional region R. Thus, during the nail penetration test, the gas flowing toward the pressure release valve 18 strikes the outer surface 61a of the shielding portion 61, and the flowing direction of the gas is deviated from the discharge path directed straight toward the pressure release valve 18 and lengthens the gas discharge path extending toward the pressure release valve 18. As a result, the fragments of the electrodes 21, 31 and the metal foils 21a, 31a fall out of the gas into the case 11, and the fragments are not scattered out of the case 11 with the gas. This obviates the generation of sparks.

The above embodiments may be modified as described below.

In the first embodiment, the region covered by the shielding member 60 may be set as described below. That is, in the front view of the case 11, the position where two diagonal lines intersect is referred to as the center of the case 11 in a front view. A line passing through the center of the case 11 in a front view and extending in the stacking direction of the electrodes 21, 31 is referred to as the center line. A region surrounded by a plane connecting a moving point at a given position on the center line and the contour of the valve body 19 in the pressure release valve 18 at the shortest distance is referred to as the three-dimensional region. An entire region in which the three-dimensional region moves when the moving point is moved over the entire dimension of the electrode assembly 12 in the stacking direction of the electrodes 21, 31 along the center line is referred to as a total three-dimensional region. In other words, the total three-dimensional region is the entire region occupied by a moving path of the three-dimensional region obtained when the moving point is moved over the entire dimension of the electrode assembly 12 in the stacking direction of the electrodes 21, 31 along the center line. A cross section of the total three-dimensional region along the tab-side end face 12b of the electrode assembly 12 exists in the covering region H and is entirely covered by the shielding member 60.

Figure 9:
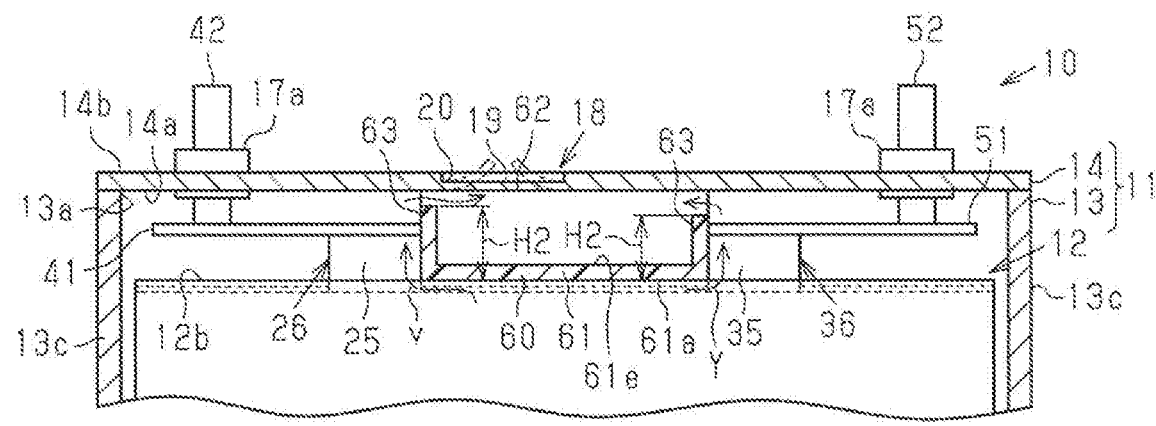
FIG. 9 is a partial cross-sectional view showing a further example of a shielding member.

As shown in FIG. 9, in each embodiment and each form, the shielding member 60 may have a shape in which the second rib 63 is arranged on both short edges of the shielding portion 61. When configured in such manner, the gas flowing toward the pressure release valve 18 from the side the negative electrode conductive member 51 is located strikes the second rib 63 so that the fragments of the electrodes 21, 31 and the metal foils 21a, 31a fall out of the gas. In the second rib 63 at the side where the negative electrode conductive member 51 is located, the projecting distance H2, which is the dimension from the outer surface 61a of the shielding portion 61, is preferably smaller (lower) than the projecting distance H2 of the second rib 63 at the side where the positive electrode conductive member 41 is located. As a result, the flow path resistance of the positive electrode side gas discharge path is greater than the flow path resistance of the negative electrode side gas discharge path, that is, the flow path cross-sectional area of the positive electrode side gas discharge path is smaller than the flow path cross-sectional area of the negative electrode side gas discharge path.

Figure 10:
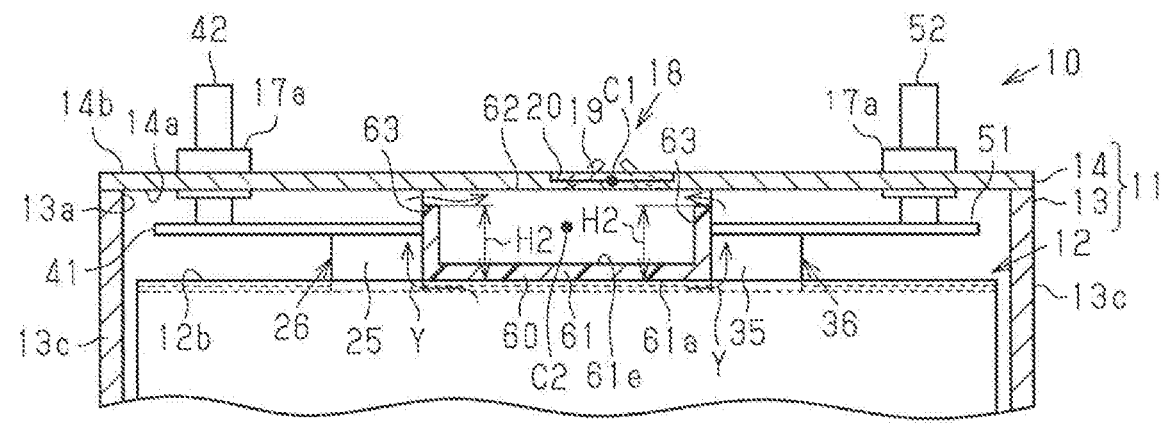
FIG. 10 is a partial cross-sectional view showing the rechargeable battery of a further example.

As shown in FIG. 10, in each embodiment and each form, the center position C1 of the pressure release valve 18 may be located closer to the negative electrode conductive member 51 than the center position C2 between the tab 25 (tab group 26) of the positive electrode 21 and the tab 35 (tab group 36) of the negative electrode 31 in the longitudinal direction of the lid body 14.

When configured in such a manner, for example, when the shielding member 60 includes the second rib 63 arranged on each of the short edges of the shielding portion 61 and when the projecting distance H2 of both second ribs 63 is the same, the positive electrode side gas discharge path is longer than the negative electrode side gas discharge path, and the flow path resistance of the positive electrode side gas discharge path is greater than the flow path resistance of the negative electrode side gas discharge path.

During the nail penetration test, the gas passing between the tabs 25 and the positive electrode side may strike the positive electrode conductive member 41 and at least one of the tab 25 of the positive electrode 21 or the positive electrode conductive member 41 may be partially melted or scraped off by the high temperature high-pressure gas and be suspended in the gas. In this case, the gas strikes the lid body 14 before being discharged out of the case 11 from the pressure release valve 18. As a result, the fragments of the tab 25 and the positive electrode conductive member 41 are not discharged out of the case 11 from the pressure release valve 18.

Figure 11:
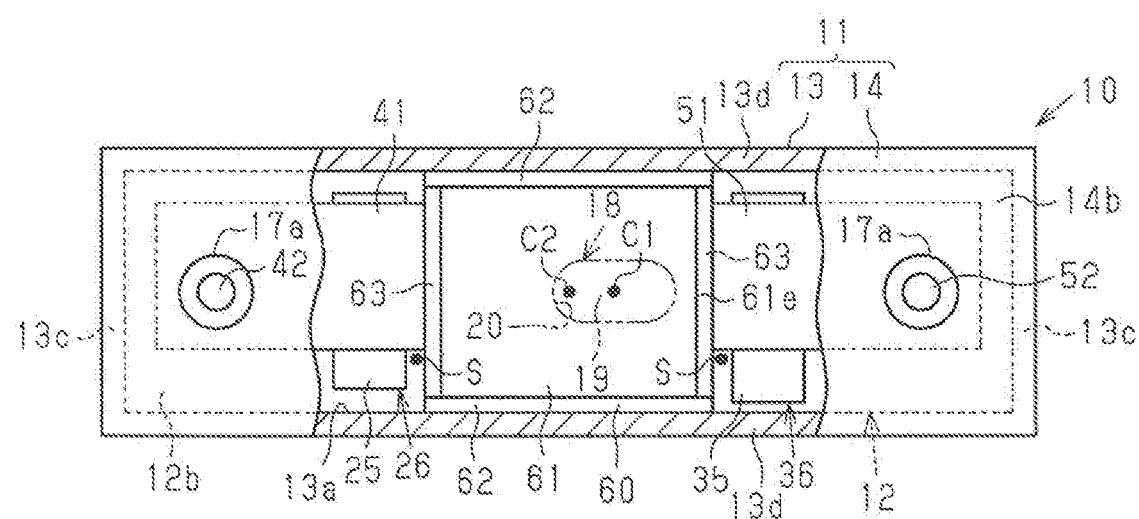
FIG. 11 is a plan view showing the rechargeable battery of a further example.
Figure 12:
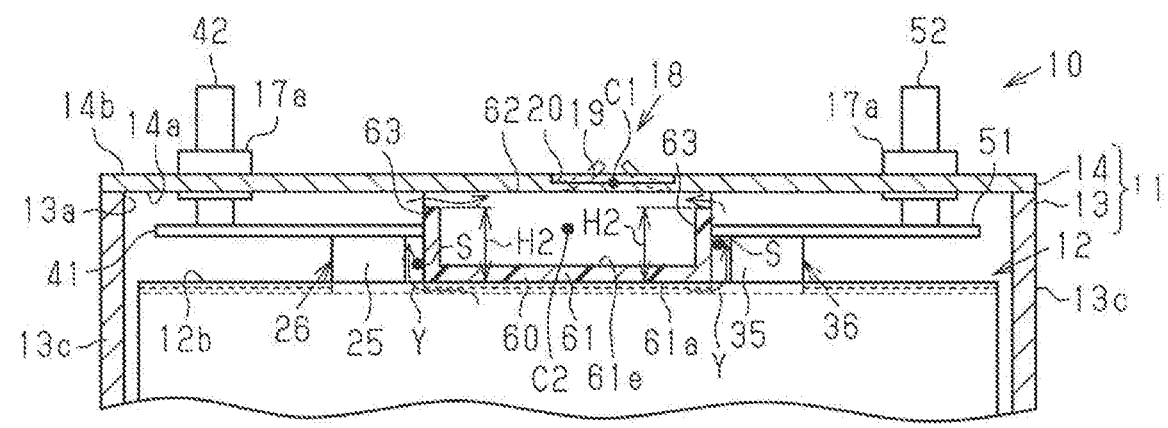
FIG. 12 is a partial cross-sectional view showing the rechargeable battery of a further example.

The tab 25 (tab group 26) of the positive electrode 21 and the tab 35 (tab group 36) of the negative electrode 31 may be modified as shown in FIGS. 11 and 12 in the rechargeable battery 10 in which the projecting distance H2 of both second ribs 63 is the same.

A gap S may be provided between the side surface of the tab group 26 on the positive electrode side and the side surface of the second rib 63 facing the tab group 26 in the longitudinal direction of the lid body 14. Similarly, a gap S may be provided between the side surface of the tab group 36 at the negative electrode side and the side surface of the second rib 63 facing the tab group 36 in the longitudinal direction of the lid body 14. The distal end of the positive electrode conductive member 41 may be arranged so as to cover the gap S from the side of the gap S where the lid body 14 is located, and the positive electrode conductive member 41 may be used as a gas striking member. Similarly, the distal end of the negative electrode conductive member 51 may be arranged so as to cover the gap S from the side of the gap S where the lid body 14 is located, and the negative electrode conductive member 51 may be used as a gas striking member.

When configured in such manner, during the nail penetration test, the generated gas flows through the space S between the second rib 63 of the shielding member 60 and the tab 25 of the positive electrode 21, and thus the tab 25 resists melting compared to when the gas flows between the tabs 25 of the positive electrode 21. As the gas that flows through the gap S strikes the positive electrode conductive member 41, the fragments of the tab 25 and the positive electrode conductive member 41 falls out from the gas, and the fragments are not discharged out of the case 11 from the pressure release valve 18.

At the negative electrode side, the gas also flows through the space S between the second rib 63 of the shielding member 60 and the tab 35 of the negative electrode 31, and the tab 35 resists melting compared to when the gas flows between the tabs 35 of the negative electrode 31. Furthermore, as the gas that flows through the gap S strikes the negative electrode conductive member 51, the fragments of the tab 35 and the negative electrode conductive member 51 falls out from the gas, and the fragments are not discharged out of the case 11 from the pressure release valve 18.

Figure 13:
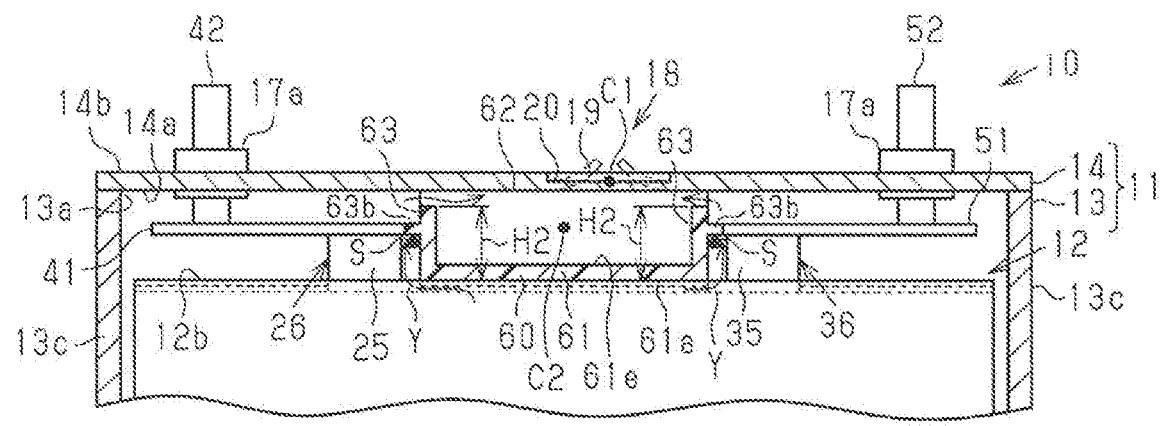
FIG. 13 is a partial cross-sectional view showing the rechargeable battery of a further example.

As shown in FIG. 13, the gas striking member that covers the gap S from the side of the gap S where the lid body 14 is located may be formed by a projection 63b projecting toward each tab 25, 35 from the second rib 63 of the shielding member 60 or, although not shown in the drawings, by the distal ends of both of the conductive members 41, 51 and the projection 63b of the second rib 63.

In the form shown in FIGS. 11 to 13, the center position C1 of the pressure release valve 18 may be located closer to the positive electrode conductive member 41 than the center position C2 between the tab 25 (tab group 26) of the positive electrode 21 and the tab 35 (tab group 36) of the negative electrode 31 in the longitudinal direction of the case main body 13. The projecting distance H2 may differ between the two second ribs 63.

The shielding member 60 spaces apart the inner surface 14a of the lid member 14 from the shielding portion 61.

Furthermore, the gas striking member does not need to cover the entire gap S, and a very small through-hole may be formed in the distal end of each conductive member 41, 51 and the projection 63b of the second rib 63.

The shielding member 60 may be shaped to include the second rib 63 on the short edge at the side where the negative electrode conductive member 51 is located instead of the side where the positive electrode conductive member 41 is located.

The shielding member 60 spaced apart from the inner surface 14a of the lid body 14 and the shielding portion 61 need not block the pressure release valve 18. Thus, the shielding member 60 may include a spacer rod 64 serving as the spacer instead of the first rib 62 and the second rib 63.

Figure 14:
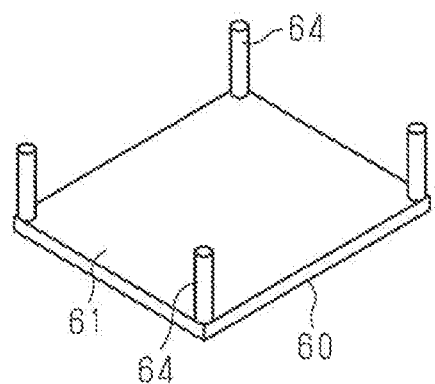
FIG. 14 is a perspective view showing a further example of the shielding member.

As shown in FIG. 14, the spacer rod 64 projects from each of the four corners of the shielding portion 61. A distal end face in the projecting direction of the spacer rod 64 contacts four locations surrounding the pressure release valve 18 of the inner surface 14a of the lid body 14.

When configured in such manner, even if the gas rises toward the pressure release valve 18 and the gas strikes the outer surface 61a of the shielding portion 61, the spacer rod 64 contacts the inner surface 14a of the lid body 14 and maintains a state in which the shielding portion 61 and the inner surface 14a are spaced apart. This avoids a situation in which the pressure release valve 18 is closed by the shielding portion 61.

Further, a flow path is formed between the adjacent spacer rods 64, and gas flowing toward the pressure release valve 18 is not blocked.

The spacer rod 64 may be thicker than shown in FIG. 14. When configured in such manner, the spacer rod 64 is not damaged by the gas generated during the nail penetration test, and a state in which the pressure release valve 18 is covered by the shielding portion 61 from the side where the electrode assembly 12 is located can be maintained.

In each embodiment and each form, the thickness of the first rib 62 and the second rib 63 may be increased to enhance the rigidity. When configured in such manner, the first rib 62 and the second rib 63 are not damaged by the gas generated during the nail penetration test. As a result, a state in which the pressure release valve 18 is covered with the shielding portion 61 from the side the electrode assembly 12 is located can be maintained by the first rib 62, and furthermore, the flow path resistance of the positive electrode side gas discharge path is greater than the flow path resistance of the negative electrode side gas discharge path and the negative electrode side gas discharge path having a greater flow path cross-sectional area than the positive electrode side gas discharge path can be ensured by the second rib 63.

In each embodiment and each form, the thickness of the shielding portion 61 may be increased to enhance the rigidity of the shielding portion 61. When configured in such manner, the shielding portion 61 is not damaged by the gas generated during the nail penetration test, and a state in which the pressure release valve 18 is covered with the shielding portion 61 from the side where the electrode assembly 12 is located can be maintained.

Figure 15:
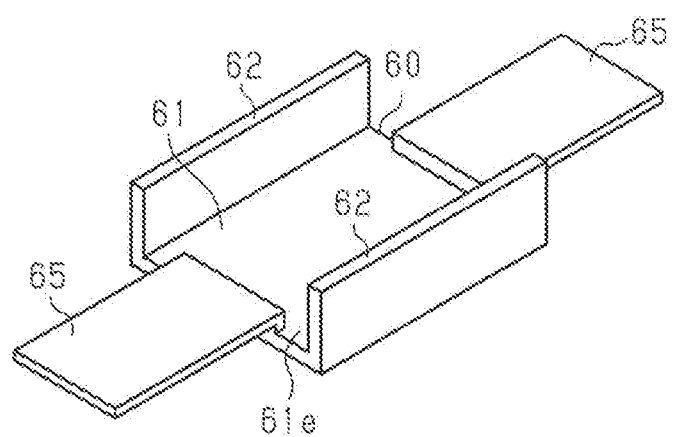
FIG. 15 is a perspective view showing a further example of the shielding member.

As shown in FIG. 15, in each embodiment and each form, the shielding member 60 may be shaped to include a baffle plate 65 projecting out in the longitudinal direction of the shielding portion 61 from both short sides of the shielding portion 61. The baffle plate 65 has a flat plate shape.

Figure 16:
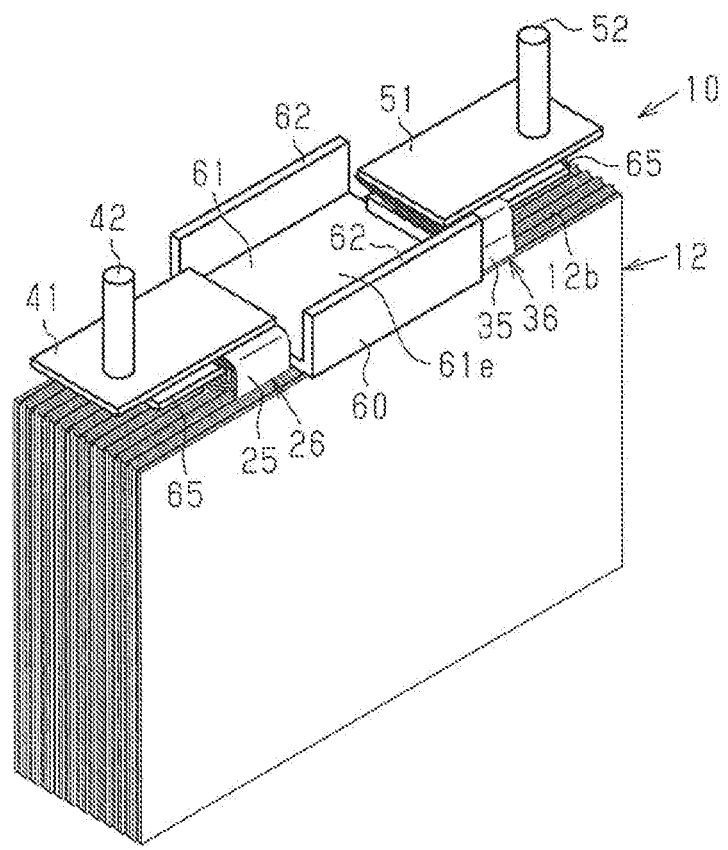
FIG. 16 is a partial perspective view showing the rechargeable battery including the shielding member of FIG. 15.
Figure 17:
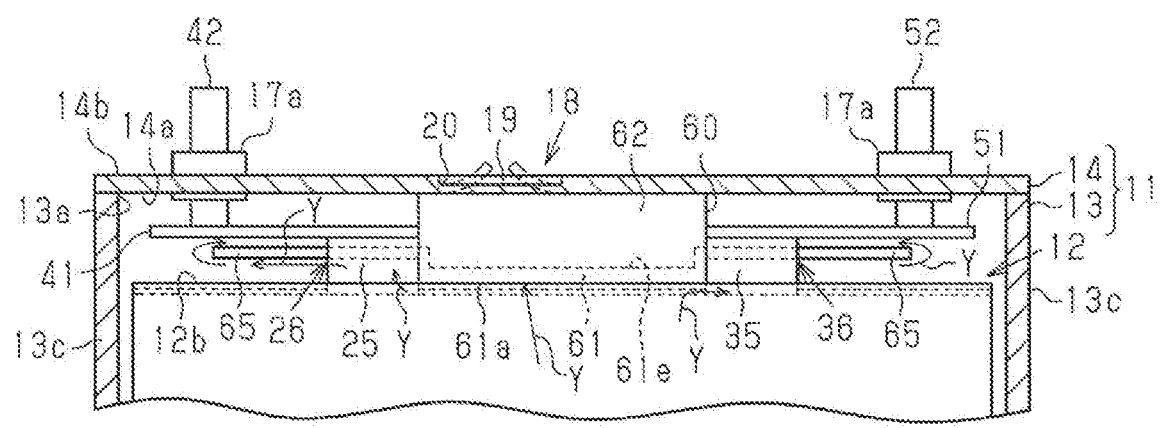
FIG. 17 is a partial cross-sectional view showing the internal structure of the rechargeable battery of FIG. 16.

As shown in FIGS. 16 and 17, each baffle plate 65 overlaps each of the tabs 25, 35 as viewed from the outer surface 14b of the lid body 14, and each of the tabs 25, 35 is covered in the longitudinal direction of the lid body 14 from the side of the tabs 25, 35 where the electrode assembly 12 is located.

When configured in such manner, as shown with by arrow Y, in each of the tab group 26, 36, when gas is discharged from between the tabs 25, 35 that are adjacent in the stacking direction, the gas strikes the baffle plate 65. This deviates the flowing direction of the gas from the discharge path directed straight to the pressure release valve 18 and thus lengthens the gas discharge path directed toward the pressure release valve 18 can be lengthened. As a result, the fragments of the electrodes 21, 31 and the metal foils 21a, 31a fall out of gas into the case 11. This reduces the fragments scattered out of the case 11 with the gas and avoids the generation of sparks.

Figure 18:
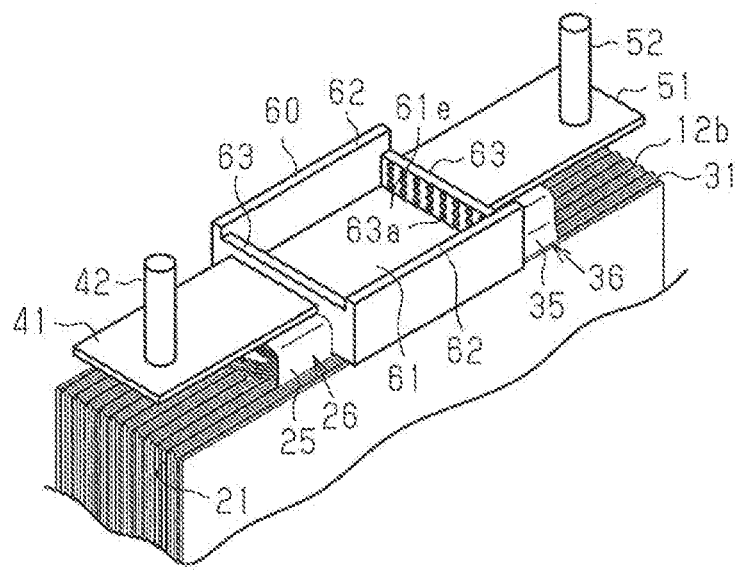
FIG. 18 is a perspective view showing a shielding member in which a gas passage hole is provided in the second rib.
Figure 19:
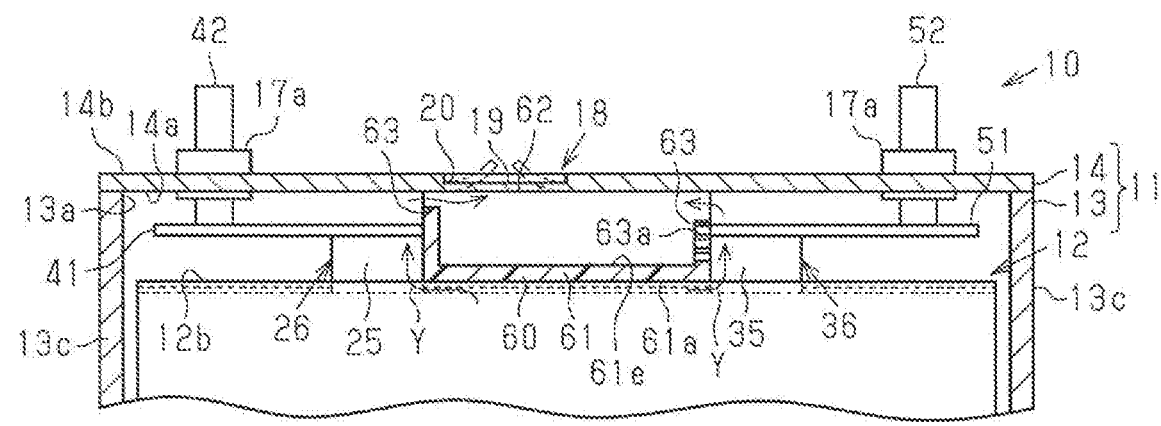
FIG. 19 is a cross-sectional view showing the shielding member of FIG. 18.

As shown FIGS. 18 and 19, when including the second rib 63 at the short edges of the shielding portion 61, the shielding member 60 may be shaped to include a plurality of gas passage holes 63a that extend through the second rib 63 at the side where the negative electrode conductive member 51 is located in the thickness-wise direction. When configured in such manner, the fragments of the electrodes 21, 31 and the metal foils 21a, 31a suspended in the gas strikes the second rib 63 and falls out of the gas. The gas may pass through the gas passage hole 63a and be released from the case 11 through the pressure release valve 18. The gas passage hole 63a functions to remove the fragments of the electrodes 21, 31 and the metal foils 21a, 31a that would cause sparks. This reduces fragments scattered out of the case 11 with the gas avoids the generation of sparks. Preferably, the hole diameter of the gas passage hole 63a is changed in accordance with the size of the fragments of each of the electrodes 21, 31 and each of the metal foils 21a, 31a suspended in the gas. Preferably, the hole diameter of the gas passage hole 63a is set to maintain the state in which the flow path resistance of the negative electrode side gas discharge path is smaller than the flow path resistance of the positive electrode side gas discharge path, in other words, the state in which the flow path cross-sectional area of the negative electrode side gas discharge path is greater than the flow path cross-sectional area of the positive electrode side gas discharge path. The gas passage hole 63a may be formed in the second rib 63 at the side where the positive electrode conductive member 41 is located, and the shielding member 60 may include the gas passage hole 63a in both second ribs 63.

Figure 20A:
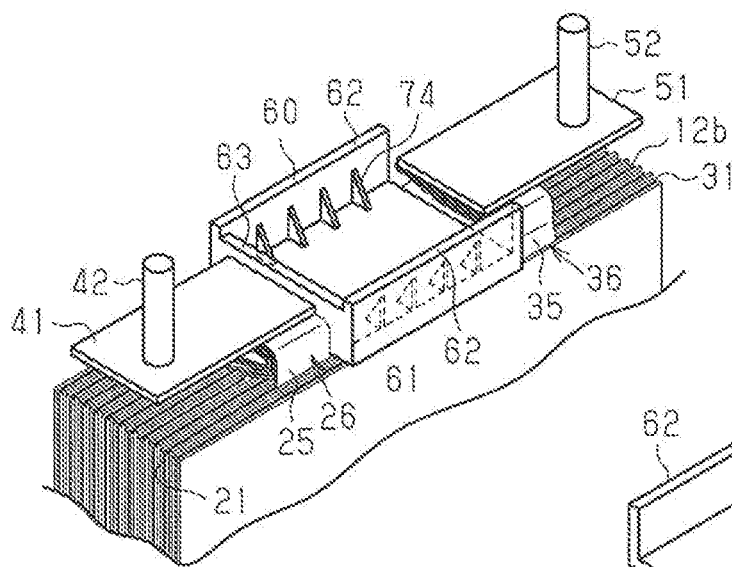
FIGS. 20A and 20B are perspective views each showing the shielding member including a reinforcement rib.

In each embodiment and each form, as shown in FIG. 20A, the shielding member 60 may include a reinforcement rib 74 connected to the shielding portion 61 and the first rib 62 and shaped extending in the short-side direction of the shielding portion 61.

Figure 20B:
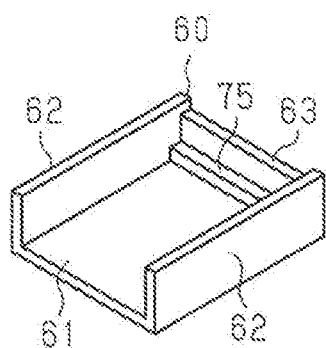

Alternatively, as shown in FIG. 20B, the shielding member 60 may include a reinforcement rib 75 connected to the shielding portion 61 and the second rib 63 and shaped extending in the short side direction of the shielding portion 61.

When configured in such manner, the shielding member 60 can be reinforced by the reinforcement ribs 74, 75 and deformation of the shielding member 60 is limited when gas strikes.

Figure 21:
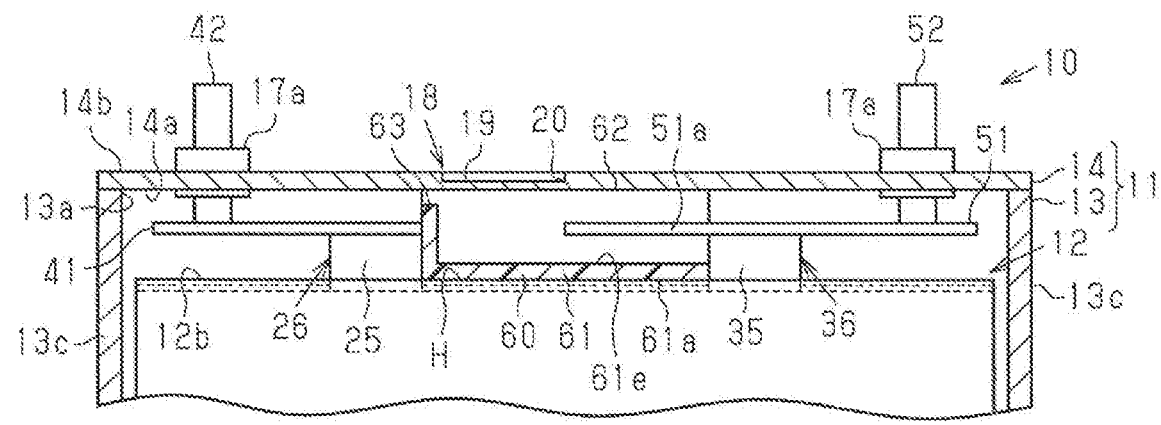
FIG. 21 is a partial cross-sectional view showing a negative electrode conductive member including an overlapping portion.

In each embodiment and each form, as shown in FIG. 21, the negative electrode conductive member 51 may include an overlapping portion 51a located closer to the positive electrode conductive member 41 than the tab group 36. The overlapping portion 51a overlaps the lid body 14 and the shielding portion 61 when viewed from the outer surface 14b of the lid body 14. A distal end face of the overlapping portion 51a, which is an longitudinal end face the negative electrode conductive member 51, overlaps the edge of the pressure release valve 18 when the lid body 14 is viewed from the outer surface 14b, and the overlapping portion 51a does not cover the pressure release valve 18 from the side of the lid body 14 where the electrode assembly 12 is located. The overlapping portion 51a may be arranged on the positive electrode conductive member 41.

When configured in such manner, the gas of which direction changes when striking the shielding portion 61 and flows to the side where the negative electrode conductive member 51 is located passes between the opposing surfaces of the overlapping portion 51a and the shielding portion 61 toward the pressure release valve 18. As a result, the overlapping portion 51a reduces contact of the high temperature gas with the lid body 14. In particular, since the negative electrode conductive member 51 is made of copper and has a high heat resistance, the overlapping portion 51a is not melted by the gas, and the overlapping portion 51a limits melting of the lid body 14.

Figure 22:
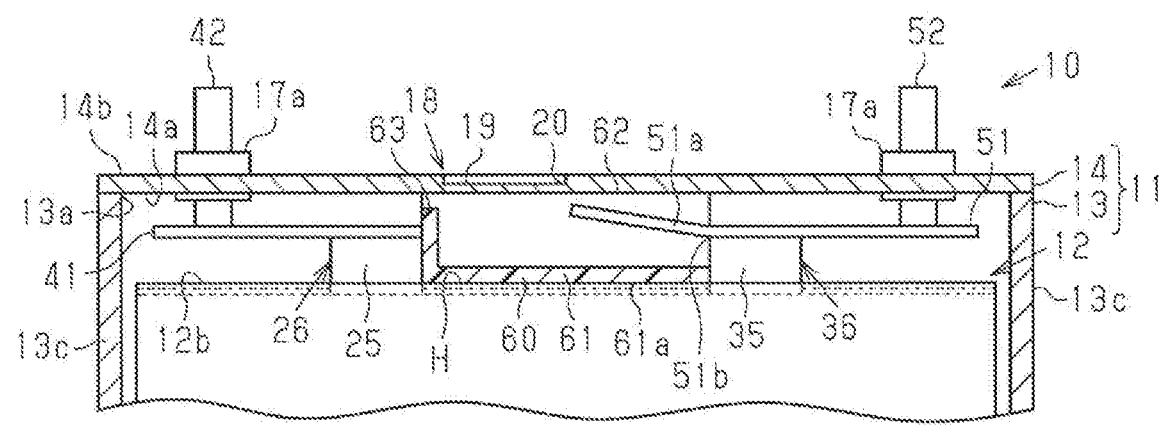
FIG. 22 is a partial cross-sectional view showing a negative electrode conductive member including an overlapping portion and a bent portion.

In each embodiment and each form, as shown in FIG. 22, the negative electrode conductive member 51 may include the overlapping portion 51a located closer to the positive electrode conductive member 41 than the tab group 36. The negative electrode conductive member 51 may include a bent portion 51b bent toward the lid body 14 so that the distal end of the overlapping portion 51a approaches the pressure release valve 18. The bent portion 51b may be located at any position as long as it is closer to the positive electrode conductive member 41 than a welded portion of the tab group 36 and the negative electrode conductive member 51. The overlapping portion 51a does not cover the pressure release valve 18 from the side the electrode assembly 12 is located. The overlapping portion 51a and the bent portion 51b may be arranged on the positive electrode conductive member 41.

When configured in such manner, the gas of which direction changes when striking the shielding portion 61 and flows to the side where the negative electrode conductive member 51 is located passes between the opposing surfaces of the overlapping portion 51a and the shielding portion 61 toward the pressure release valve 18 along the surface of the overlapping portion 51a. A distal end face of the overlapping portion 51a is arranged to face the edge of the pressure release valve 18. Thus, gas flows along the overlapping portion 51a toward the pressure release valve 18. As a result, the gas does not strike the periphery of the pressure release valve 18 in the lid body 14, and the periphery of the pressure release valve 18 in the lid body 14 does not melt.

Figure 23:
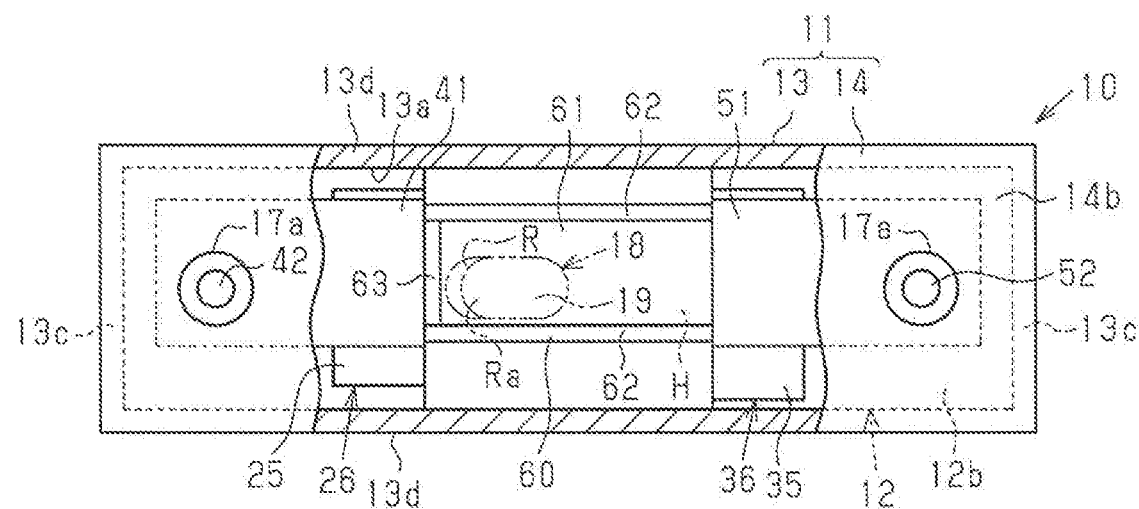
FIG. 23 is a plan view showing a shielding member including a first rib of a further example.

In each embodiment and each form, the pair of first ribs 62 of the shielding member 60 does not have to project from each long edge of the shielding portion 61. For example, as shown in FIG. 23, in the shielding portion 61, the first rib 62 may project from position located near each other in the short-side direction. When viewed from the outer surface 14b of the lid body 14, the first ribs 62 may be located next to each other in the longitudinal direction of the lid body 14 between the positive electrode conductive member 41 and the negative electrode conductive member 51.

When configured in such manner, one longitudinal end face of each of the two first ribs 62 contacts the distal end face defined by one longitudinal end face the positive electrode conductive member 41. The other longitudinal end face of each of the two first ribs 62 contacts the distal end face defined by one longitudinal end face of the negative electrode conductive member 51. The shielding member 60 immediately contacts the distal end face of the positive electrode conductive member 41 or the negative electrode conductive member 51 when slightly moved in the longitudinal direction of the lid body 14. Thus, the shielding member 60 restricts movement of the lid body 14 in the longitudinal direction. Therefore, the positive electrode conductive member 41 and the negative electrode conductive member 51 serves as movement restriction members that restrict movement of the shielding member 60 in the longitudinal direction of the lid body 14.

In each embodiment and each form, since the movement of the shielding member 60 in the longitudinal direction of the lid body 14 is restricted, the second rib 63 may contact the side surface of the tab group 26 at the positive electrode side, and the first rib 62 may contact the side surface of the tab group 36 at the negative electrode side.

In each embodiment and each form, since the movement of the shielding member 60 in the longitudinal direction of the lid body 14 is restricted, the second rib 63 may contact the side surface of the tab group 26 at the positive electrode side, and the first rib 62 may contact the end face of the negative electrode conductive member 51.

Figure 24:
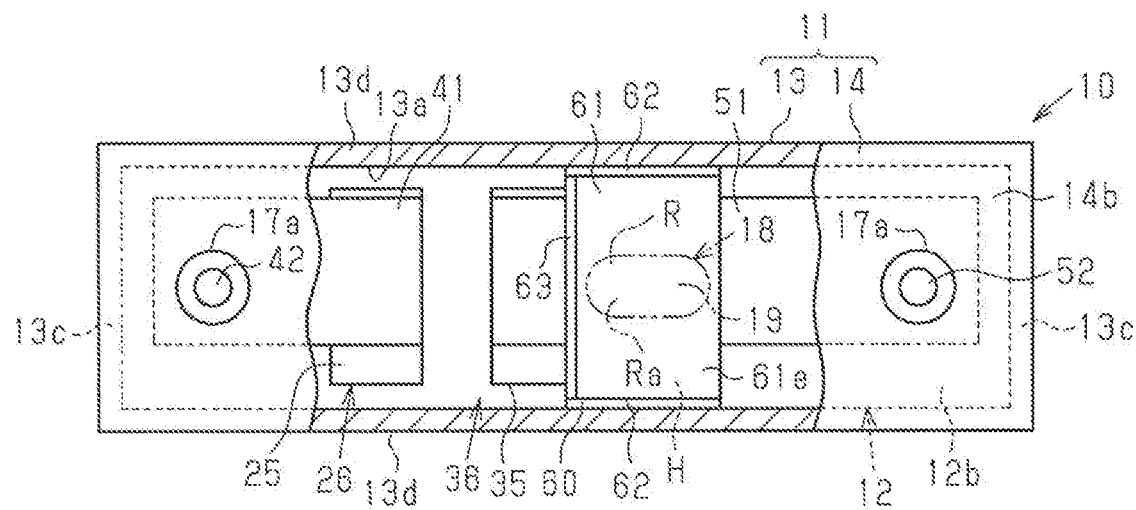
FIG. 24 is a plan view showing a shielding member supported by the negative electrode conductive member.
Figure 25:
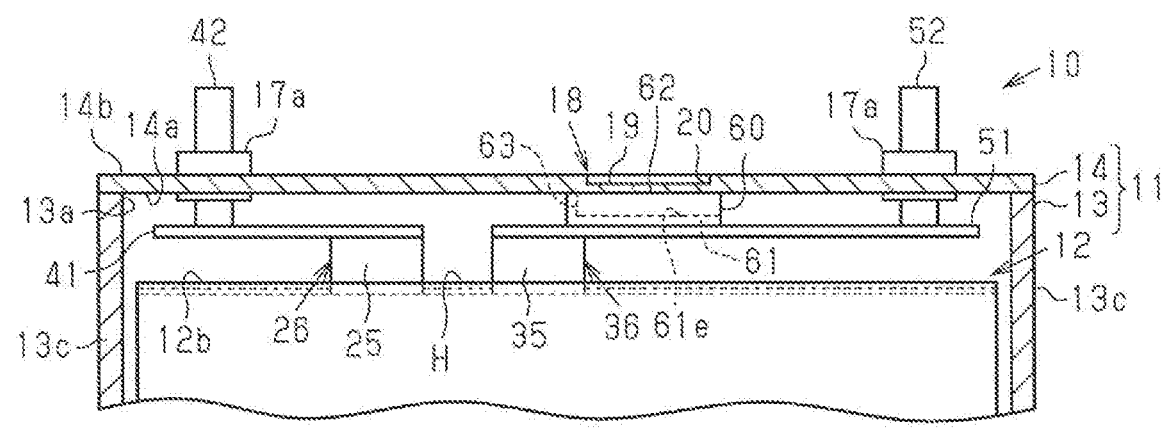
FIG. 25 is a partial cross-sectional view showing a rechargeable battery including the shielding member of FIG. 24.

In each embodiment and each form, as shown in FIGS. 24 and 25, when the lid body 14 is viewed from the outer surface 14b, the pressure release valve 18 may be arranged at a position overlapping the negative electrode conductive member 51, and the shielding member 60 may be mounted on the negative electrode conductive member 51.

In this case, the shielding member 60 may or may not entirely cover the cross section Ra located on the tab-side end face 12b of the three-dimensional region R connecting the center point P existing at the short-circuited part in the nail penetration test and the pressure release valve 18. It is only required that the shielding member 60 include a rib having a surface that intersects the gas flow path. The first rib 62 and the second rib 63 include an outer surface that rises toward the lid body 14 from the shielding portion 61 and intersects the gas path along the inner surface 61e of the shielding portion 61.

When configured in such manner, the gas generated during the nail penetration test flows to a location closer to the lid body 14 than the negative electrode conductive member 51 or the positive electrode conductive member 41, and then flows along the gas path that extends along the inner surface 61e of the shielding portion 61. The remaining gas strikes the first rib 62 and the second rib 63, rises along the first and second ribs 62, 63, and passes through a gap between the distal end face of each rib 62, 63 and the inner surface 14a of the lid body 14 to reach the pressure release valve 18.

Thus, the fragments of the electrodes 21, 31 and the metal foils 21a, 31a fall out of the gas into the case 11 when striking the first rib 62 and the second rib 63. This reduces fragments scattered out of the case 11 with the gas and limits the generation of sparks. Although not shown in the drawings, when the lid body 14 is viewed from the outer surface 14b, the pressure release valve 18 is arranged at a position overlapping the positive electrode conductive member 41 and may be mounted on the positive electrode conductive member 41.

Figure 26A:
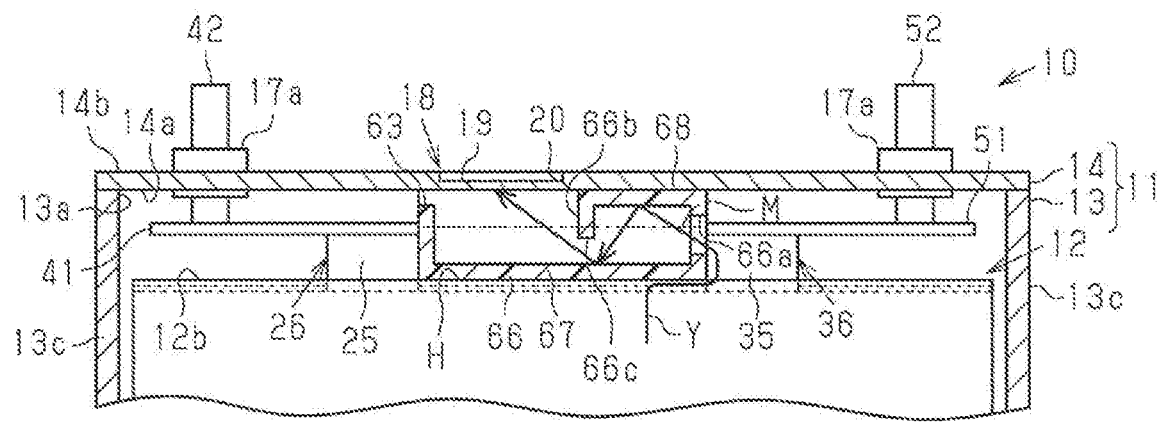
FIG. 26A is a cross-sectional view showing a shielding member including a path changing wall.

As shown in FIG. 26A, a shielding member 66 may have the form of a quadrangle box, and the shielding member 66 may be mounted on the tab-side end face 12b so that a center axis M of the shielding member 66 extends in the longitudinal direction of the lid body 14. The shielding member 66 includes a shielding portion 67 at a bottom portion supported by the tab-side end face 12b of the electrode assembly 12. The shielding member 66 includes a gas inlet 66a at one end side in the axial direction (side where negative electrode conductive member 51 is located). The shielding member 66 includes a gas outlet 66b open to the pressure release valve 18 at the other end side in the axial direction in a top plate 68 facing the lid body 14. In addition, the shielding member 66 accommodates includes a path changing wall 66c. The path changing wall 66c is plate-shape and projects toward the shielding portion 67 from the inner surface of the top plate 68 and has a gap between the projecting end of the path changing wall 66c and the shielding portion 67. The path changing wall 66c is shaped so that the long side is extended in the short-side direction of the lid body 14.

When configured in such manner, the gas generated during the nail penetration test is changed in direction when striking the shielding portion 67. After flowed to the side where the negative electrode conductive member 51 is located, the gas flows into the shielding member 66 from the gas inlet 66a as shown by arrow Y. Although the gas flows toward the gas outlet 66b opened to the pressure release valve 18, the gas path is changed and directed toward the shielding portion 67 by the path changing wall 66c after the gas strikes the top plate 68 of the shielding member 66. Then, the gas flows between the path changing wall 66c and the shielding portion 67 and out of the shielding member 66 from the gas outlet 66b. The gas is then released out of the case 11 from the pressure release valve 18.

Therefore, the gas strikes the top plate 68 and the shielding portion 67 in the shielding member 66 because of the arrangement of the path changing wall 66c. As a result, the fragments of the electrodes 21, 31 and the metal foils 21a, 31a fall out of the gas into the case 11 as the gas strikes the shielding portion 67 and the top plate 68, and the fragments are not scattered out of the case 11 with the gas. This limits the generation of sparks. The force of the gas is decreased when the gas strikes the shielding portion 67 and the top plate 68 so that the fragments fall out of the gas.

Figure 26B:
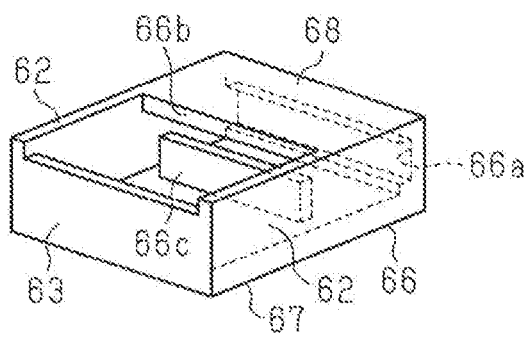
FIG. 26B is a perspective view showing a shielding member of a further example.

As shown in FIG. 26B, the path changing wall 66c projects from the inner surface of the shielding portion 67 instead of the top plate 68, and a gap is formed between the projecting end of the path changing wall 66c and the top plate 68 and between the path changing wall 66c and the first rib 62 at the two sides. When configured in such manner, the gas that flows into the shielding member 66 from the gas inlet 66a also strikes the first rib 62, which is connected to the shielding portion 67 and the top plate 68, in addition to the top plate 68 and the shielding portion 67.

Figure 27:
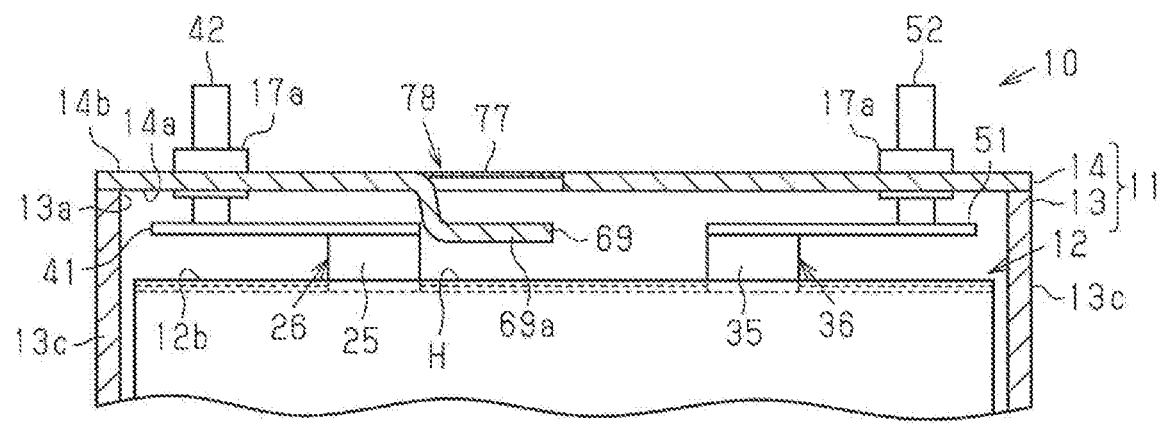
FIG. 27 is a partial cross-sectional view showing a shielding member manufactured by pressing a lid body.

As shown in FIG. 27, in each embodiment and each form, the lid body 14 may be pressed to provide a shielding member 69 integrated with the lid body 14, and the shielding member 69 may be arranged so as not to short-circuit the positive electrode 21 and the negative electrode 31 between the inner surface 14a of the lid body 14 and the tab-side end face 12b of the electrode assembly 12. The surface of the shielding member 69 is covered with a coating of an insulating resin or ceramic to prevent short-circuiting of the positive electrode 21 and the negative electrode 31 that would be caused by the shielding member 69.

A hole in the lid body 14 may be covered with a sheet-like valve body 77 by forming the shielding member 69 in the lid body 14, and a pressure release valve 78 may include the valve body 77. The release pressure of the pressure release valve 78 is set to a pressure at which the pressure release valve rips open before the case 11 or at a joining portion of the case main body 13 and the lid body 14 cracks or breaks.

When configured in such manner, a shielding portion 69a of the shielding member 69 entirely covers the cross section Ra located on the tab-side end face 12b of the three-dimensional region R connecting the center point P existing in the short-circuited part and the pressure release valve 78. Thus, during the nail penetration test, gas flowing toward the pressure release valve 78 strikes the outer surface of the shielding portion 69a, and the flowing direction of the gas is deviated from the path directed straight toward the pressure release valve 78 to lengthen the gas discharge path extending toward the pressure release valve 78. As a result, the fragments of the electrodes 21, 31 and the metal foils 21a, 31a fall out of gas into the case 11, and the fragments are not scattered out of the case 11 with the gas. This limits the generation of sparks.

Figure 28:
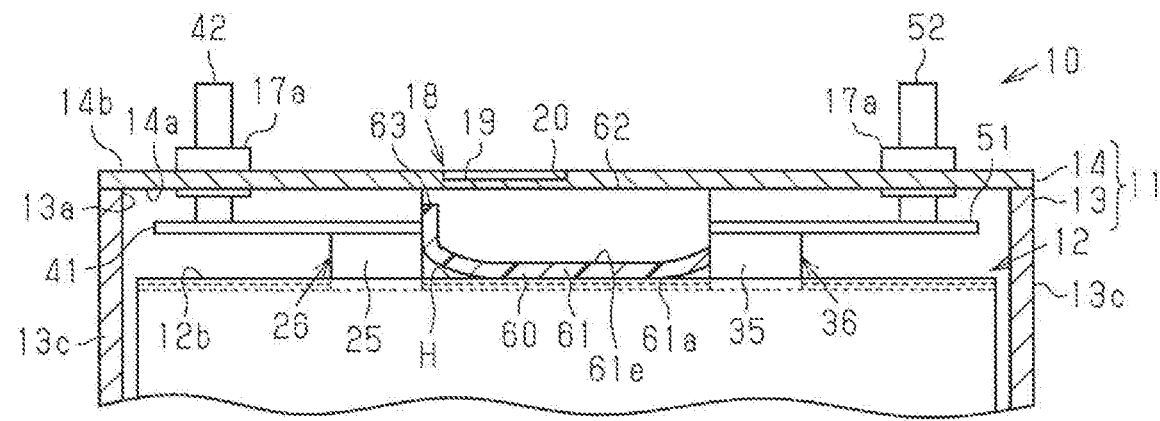
FIG. 28 is a partial cross-sectional view showing a shielding member including a round shielding portion.

As shown in FIG. 28, in each embodiment and each form, the shielding portion 61 may have a round shape gradually bulging out toward the tab-side end face 12b from the peripheral edge toward the central part. In this case, the shielding member 60 restricts movement between the inner surface 14a of the lid body 14 and the tab-side end face 12b of the electrode assembly 12 as the first rib 62 contacts the inner surface 14a of the lid body 14. The round shape is not limited to the shape shown in FIG. 28 and may be a shape bulging out toward the tab-side end face 12b entirely from the peripheral edge toward the central part of the shielding portion 61.

When configured in such manner, during the nail penetration test, the gas flowing toward the pressure release valve 18 strikes the outer surface 61a of the shielding portion 61. However, the shielding portion 61 is round. This reduces deformation of the shielding portion 61 that would be caused by gas.

Figure 29:
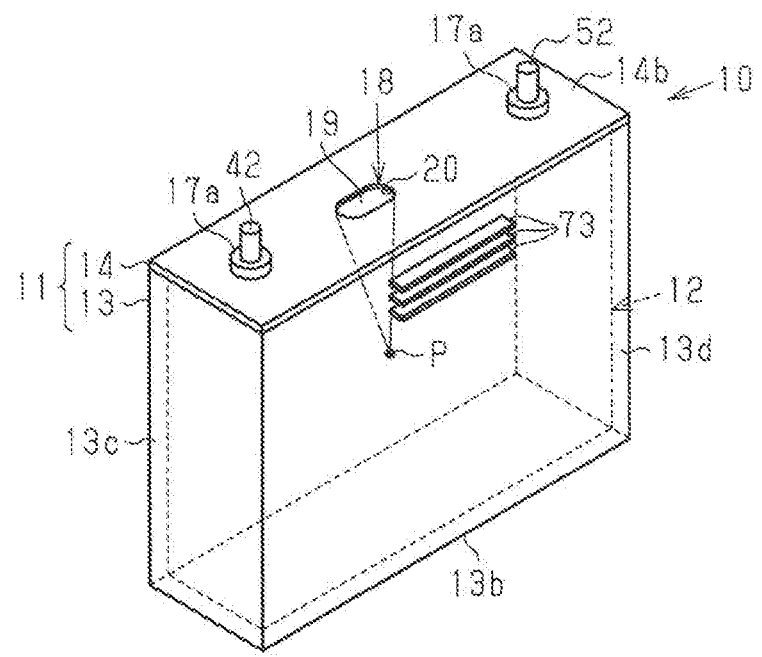
FIG. 29 is a perspective view showing a rechargeable battery including a case rib.

In each embodiment and each form, as shown in FIG. 29, the rechargeable battery 10 may include a case rib 73 at the long side wall 13d of the case main body 13. The case rib 73 has a rectangular plate shape in which the long side is extended in the longitudinal direction of the long side wall 13d, and there is more than one case rib 73 arranged in the short-side direction of the long side wall 13d. Furthermore, when the lid body 14 is viewed from the outer surface 14*b*, the case rib 73 is arranged along the first rib 62 of the shielding member 60.

When configured in such manner, during the nail penetration test, the electrode assembly 12 is expanded in the stacking direction as the temperature rises, and the case 11 is deformed and widened in the stacking direction by the expansion of the electrode assembly 12. However, the deformation of the case 11 in the stacking direction can be reduced by the case rib 73. As a result, the gap between the outer surface of the first rib 62 of the shielding member 60 and the inner surface of the long side wall 13*d* does not widen. This limits passage of the gas through the gap.

Figure 30:
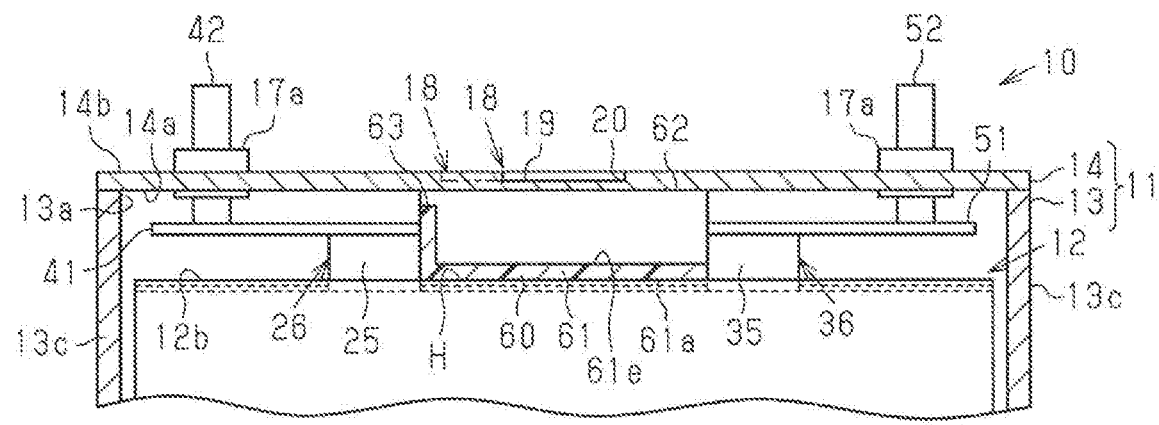
FIG. 30 is a partial cross-sectional view showing a rechargeable battery in which the pressure release valve is shifted toward the negative electrode conductive member.

In each embodiment, as shown in FIG. 30, the pressure release valve 18 may be arranged closer to the negative electrode conductive member 51 than the embodiment. When configured in such manner, the gas of which the direction is changed when striking the shielding portion 61 and which flows to the side where the negative electrode conductive member 51 is located is deflected at the end edge of the shielding portion 61 toward the pressure release valve 18. In this case, since the pressure release valve 18 is closer to the negative electrode conductive member 51, the gas deflected toward the pressure release valve 18 from the shielding portion 61 does not strike the lid body 14, and the lid body 14 is not melted by the heat of the gas.

Figure 31:
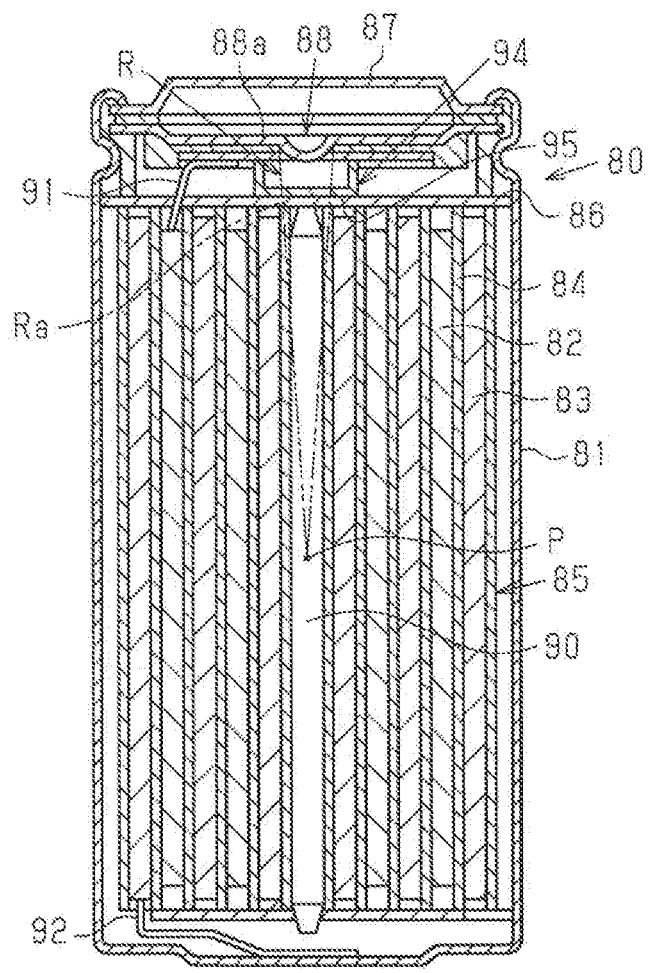
FIG. 31 is a cross-sectional view showing a cylindrical-type rechargeable battery.

As shown in FIG. 31, the rechargeable battery 80 may be of a cylindrical type. The rechargeable battery 80 includes an electrode assembly 85 of a winding type in which a band-shaped positive electrode 82 and a band-shaped negative electrode 83 are stacked and wound by the separator 84 in a hollow circular column-shaped case 81. The case 81 is made of metal and has a shape in which one end in the axial direction is closed and the other end is open. The case 81 is filled with an electrolytic solution, and the separator 84 is impregnated in the electrolytic solution. The rechargeable battery 80 includes an insulating plate 86 at both ends in the axial direction of the electrode assembly 85.

The rechargeable battery 80 includes a lid body 87 serving as a wall at the open end of the case 81, and a pressure release valve 88 arranged at the inner side of the lid body 87. The pressure release valve 88 is electrically connected to the lid body 87, and a disc plate 88*a* of the pressure release valve 88 is ripped open to release the pressure in the case 81 out of the case 81 during the nail penetration test when the pressure in the case 81 reaches the release pressure by internal short circuit. The rechargeable battery 80 includes a center pin 90 arranged at the center of the electrode assembly 85. A positive electrode lead 91 is connected to the positive electrode 82 of the electrode assembly 85, and a negative electrode lead 92 is connected to the negative electrode 83. The positive electrode lead 91 has one end fixed to the positive electrode 82 and another end welded to the pressure release valve 88 to be electrically connected to the lid body 87. The negative electrode lead 92 has one end fixed to the negative electrode 83 and another end welded to the case 81 for electrical connection.

The rechargeable battery 80 includes a shielding member 94 that covers the pressure release valve 88 from the side of the lid body 14 where the electrode assembly 85 is located. In the front view of the case 81, that is, when the case 81 is viewed in the radial direction, the center in the axial direction and the radial direction of the case 81 is referred to as the center of the case 81 in a front view. In the cylindrical-type rechargeable battery 80, the radial direction of the case 81 is the stacking direction (direction of X-axis) of the electrodes 82, 83. A point located at the center of the case 81 in the front view and located at the center of the electrode assembly 85 in the stacking direction is referred to as the center point P. A region surrounded by a plane connecting the center point P and a contour of the pressure release valve 88 at a shortest distance is referred to as a three-dimensional region R. In the electrode assembly 85, a cross section Ra of the three-dimensional region R exists on the end face at the side where the pressure release valve 88 is located in the axial direction. The cross section Ra is entirely covered by a plate-shaped shielding portion 95 of the shielding member 94.

In the cylindrical-type rechargeable battery 80, the region covered by the shielding portion 95 may be set in the same manner as the second embodiment or other modified example. For example, when setting the three-dimensional region R according to the second embodiment, the X-axis extends along the radial direction of the case 81 (stacking direction of the electrodes 82, 83), and the Y-axis is orthogonal to the X-axis and parallel to the lid body 87. A plane that passes through the center of the case 81 in the front view in which the case 81 taken in the direction of the X-axis and that is parallel to the end face of the electrode assembly 85 is referred to as a hypothetical plane. A line in which a straight line connecting both ends of the pressure release valve 88 along the direction of the Y-axis is reflected on the hypothetical plane viewed from the outer surface of the lid body 87 is referred to as a hypothetical line. A plane formed by reflecting the hypothetical line over the entire dimension of the electrode assembly 85 in the direction of the X-axis is referred to as a bottom plane. A region surround by a plane connecting the contour of the bottom plane and the contour of the pressure release valve 88 at a shortest distance is referred to as the three-dimensional region R.

The shielding member 60 may be made of metal. When the shielding member 60 is made of metal, an insulating member is located between a member of the positive electrode potential (positive electrode conductive member 41 and positive electrode 21) and a member of the negative electrode potential (negative electrode conductive member 51 and negative electrode 31). The insulating member may be integrated with one or both of a member charged with potentials and the shielding member 60. The insulating member may be a coating of an insulating resin or ceramic.

Alternatively, when the shielding member 60 is made of metal, the shielding member 60 is arranged not to contact one of the members of the positive electrode potential (positive electrode conductive member 41 and positive electrode 21) or the member of the negative electrode potential (negative electrode conductive member 51 and negative electrode 31) when contacting the other member.

When configured in such a manner, the shielding member 60 is easily resists melting that would be caused by the high temperature high-pressure gas.

When made of metal, the shielding member 60 may be welded and fixed to the lid body 14, each conductive member 41, 51 or other members. When configured in such a manner, heat resistant coating is preferably performed on the welded location.

The tab 35 of the negative electrode 31 is shaped to project from an end face of the electrode assembly 12 that differs from the tab-side end face 12*b*. In this case, the negative electrode tab group 36 also exists on an end face differing from the tab-side end face 12*b*, and the negative electrode conductive member 51 also has a shape bent from the projecting end face of the tab 35 to the tab-side end face 12*b* where the positive electrode tab 25 projects.

In the first embodiment, the shielding portion 61 of the shielding member 60 covers the entire cross section Ra of the three-dimensional region R, but the shielding portion 61 may merely cover part of the cross section Ra.

When configured in such manner, during the nail penetration test, some of the gas flowing toward the pressure release valve 18 strikes the outer surface 61*a* of the shielding portion 61 so that the flowing direction of the gas is deviated from the discharge path directed straight toward the pressure release valve 18, and the gas discharge path toward the pressure release valve 18 can be lengthened. As a result, the fragments of the electrodes 21, 31 and the metal foils 21*a*, 31*a* fall out of gas into the case 11, and the fragments are not scattered out of the case 11 with the gas. This limits the generation of sparks.

Furthermore, during the nail penetration test, some of the generated gas flows in the stacking direction of the electrode assembly 12 along the outer surface 61*a* of the shielding portion 61. The gas that does not strike the shielding portion 61 also flows in the stacking direction of the electrode assembly 12. The electrode assembly 12 is expanded in the stacking direction as the temperature rises, and the gas flows toward the pressure release valve 18 from both sides in the stacking direction of the electrode assembly 12. The gas strikes the first rib 62, and the fragments of the electrodes 21, 31 and the metal foils 21*a*, 31*a* fall out of the gas.

In the second embodiment, the shielding portion 61 of the shielding member 60 covers the entire cross section Ra of the three-dimensional region R but the shielding portion 61 may merely cover a part of the cross section Ra.

When configured in such manner, during the nail penetration test, some of the gas flowing toward the pressure release valve 18 strikes the outer surface 61*a* of the shielding portion 61 so that the flowing direction of the gas is deviated from the discharge path directed straight toward the pressure release valve 18, and the gas discharge path toward the pressure release valve 18 can be lengthened. As a result, the fragments of the electrodes 21, 31 and the metal foils 21*a*, 31*a* fall out of gas into the case 11, and the fragment can be suppressed from flying off to the outside of the case 11 with the gas, thus suppressing the generation of sparks.

Furthermore, during the nail penetration test, a part of the generated gas is flowed in the stacking direction of the electrode assembly 12 along the outer surface 61*a* of the shielding portion 61. The gas that does not strike the shielding portion 61 also flows in the stacking direction of the electrode assembly 12. The electrode assembly 12 is expanded in the stacking direction by the temperature rise, and the gas flows toward the pressure release valve 18 from both sides in the stacking direction of the electrode assembly 12. Such gas strikes the first rib 62, and the fragments of the electrodes 21, 31 and the metal foils 21*a*, 31*a* fall from the gas.

In the shielding member 60, the first rib 62 may project from only of the long edges of the shielding portion 61.

In the shielding member 60, the second rib 63 may be omitted, and the first rib 62 may be omitted.

Figure 32:
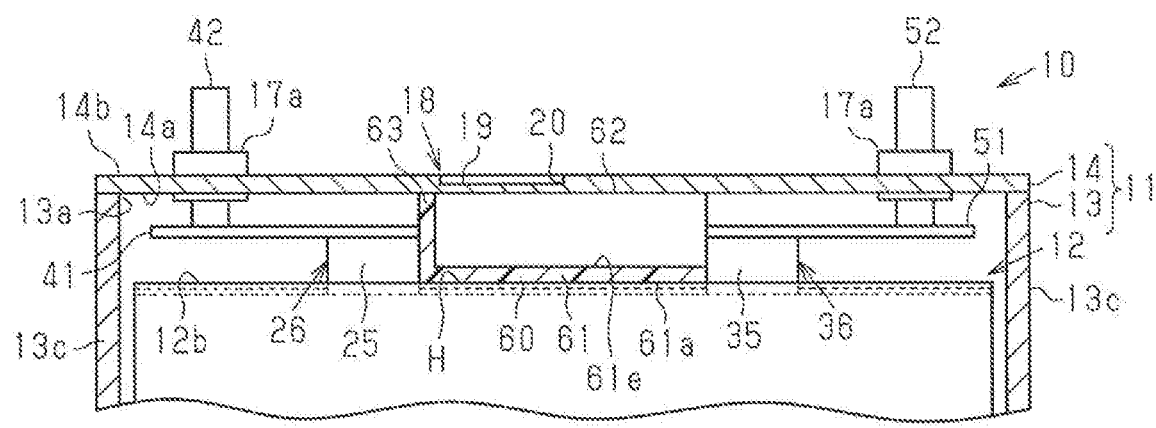
FIG. 32 is a partial cross-sectional view showing a shielding member including a second rib in contact with the inner surface of the lid body.

In each embodiment and each form, as shown in FIG. 32, the projecting end from the shielding portion 61 of the second rib 63 may contact the inner surface 14*a* of the lid body 14. When configured in such a manner, during the nail penetration test, even if the shielding member 60 is moved in the longitudinal direction of the lid body 14 when receiving the gas pressure, as long as the second rib 63 is in contact with the lid body 14, the gas flowing toward the pressure release valve 18 strikes the second rib 63, and the fragments of the electrodes 21, 31 and the metal foils 21*a*, 31*a* fall from the gas.

The shielding member 60 made of resin is not mounted on the tab-side end face 12*b* and may be joined with the inner surface 14*a* of the lid body 14 or other members by adhesion, welding, and the like.

In each embodiment and each form, the shielding portion 61 of the shielding member 60 does not need to entirely cover the covering region H in the tab-side end face 12*b*. The shielding portion 61 may have the same size as the cross section Ra or be larger than the cross section Ra as long as the cross section Ra on the tab-side end face 12*b* is entirely covered.

The separator 24 does not have to be of a type in which one separator is arranged between each positive electrode 21 and the adjacent negative electrode 31, and for example, may be a bag-shaped separator accommodating the positive electrode 21.

Alternatively, the separator may be an elongated type and bent in a zigzag manner between the positive electrodes 21 and the negative electrodes 31.

The electrode assembly may be of a winding type in which a band-shaped positive electrode and a band-shaped negative electrode are insulated by a separator and wound around a winding axis.

The power storage apparatus may be a different type of power storage apparatus such as an electrical double layer capacitor.

In each embodiment and each form, the rechargeable battery 10 is a lithium ion rechargeable battery but instead may be a different type of rechargeable battery such as nickel-metal hydride battery. It is only required that the rechargeable battery moves ions and exchanges charges between the positive electrode active material layer and the negative electrode active material layer.

DESCRIPTION OF REFERENCE CHARACTERS

C1, C2) center position; M) center axis; K) hypothetical plane; P) center point; R) three-dimensional region; Ra) cross-section; S) gap; S1) bottom plane; 10) rechargeable battery serving as power storage apparatus; 11) case; 12) electrode assembly; 12*b*) tab side end face serving as end face; 14) lid body serving as wall; 14*a*) inner surface; 14*b*, 61*a*) outer surface; 18) pressure release valve; 21) positive electrode serving as electrode; 25, 35) tab; 26) tab group functioning as movement restriction member; 31) negative electrode serving as electrode; 36) tab group functioning as movement restriction member; 41) positive electrode conductive member functioning as movement restriction member; 51) negative electrode conductive member functioning as movement restriction member; 51*a*) overlapping portion; 51*b*) bent portion; 60, 66) shielding member; 61) shielding portion; 62) first rib serving as rib configuring spacer; 63) second rib; 63*a*) gas passage hole; 63*b*) projection serving as striking member; 64) spacer rod; 65) baffle plate; 66*a*) gas inlet; 66*b*) gas outlet; 66*c*) path changing wall; 74) reinforcement rib

The invention claimed is:

1. A power storage apparatus comprising:
an electrode assembly having a layered structure and including electrodes that are insulated from each other and have different polarities;
an electrolytic solution;

a case that accommodates the electrode assembly and the electrolytic solution;

a pressure release valve that exists in a wall of the case and is configured to be ripped open when pressure in the case reaches a release pressure in order to release the pressure out of the case; and a shielding member located between an inner surface of the wall and an end face of the electrode assembly facing the inner surface, wherein an axis extending in a stacking direction of the electrodes is referred to as an X-axis, an axis orthogonal to the X-axis and parallel to the wall is referred to as a Y-axis, a point located in a center of the case in a front view of the case taken in a direction of the X-axis and located in a center of a dimension of the electrode assembly in the direction of the X-axis is referred to as a center point, a region surrounded by a plane connecting the center point and a contour of the pressure release valve at a shortest distance is referred to as a three-dimensional region, the shielding member includes a shielding portion that at least partially covers a cross section of the three-dimensional region along the end face of the electrode assembly, the electrodes having different polarities are a positive electrode and a negative electrode, the positive electrode and the negative electrode include a positive electrode tab and a negative electrode tab, respectively, and the positive electrode tab is shaped to project from the end face of the electrode assembly, the power storage apparatus further comprises:
a positive electrode conductive member connected to the positive electrode tab; and
a negative electrode conductive member connected to the negative electrode tab, the positive electrode tab and the positive electrode conductive member have a lower melting point than the negative electrode tab and the negative electrode conductive member, the positive electrode conductive member and the negative electrode conductive member are lined in a direction of the Y-axis, the shielding member includes an X-axis rib extending in the direction of the X-axis and located between the positive electrode conductive member and the pressure release valve, a path of gas directed in a planar direction of the wall toward the pressure release valve from a side where the positive electrode conductive member is located defines a positive electrode side gas discharge path, a path of the gas in the planar direction of the wall directed toward the pressure release valve from a side where the negative electrode conductive member is located defines a negative electrode side gas discharge path, a flow path resistance generated with respect to the gas in the positive electrode side gas discharge path is greater than a flow path resistance generated with respect to the gas in the negative electrode side gas discharge path, and the positive electrode side gas discharge path has a flow path cross-sectional area smaller than that of the negative electrode side gas discharge path.

2. The power storage apparatus according to claim 1, wherein the shielding member includes a spacer on the shielding portion to contact a portion in the inner surface of the wall surrounding the pressure release valve to space apart the shielding portion and the wall.

3. The power storage apparatus according to claim 2, wherein the spacer is a plurality of spacer rods shaped to project from the shielding portion.

4. The power storage apparatus according to claim 2, wherein the shielding portion includes an edge extending in a direction of the Y-axis, and the spacer is a Y-axis rib projected toward the wall from the edge extending in the direction of the Y-axis.

5. The power storage apparatus according to claim 4, wherein the shielding portion includes two edges extending in the direction of the Y-axis, and the Y-axis rib is projected from each of the two edges extending in the direction of the Y-axis.

6. The power storage apparatus according to claim 4, wherein the shielding portion includes an edge extending in the direction of the X-axis, and the X-axis rib is projected toward the wall from the edge extending in the direction of the X-axis.

7. The power storage apparatus according to claim 6, wherein the X-axis rib includes a gas passage hole.

8. The power storage apparatus according to claim 4, further comprising a reinforcement rib connected to the shielding portion and the Y-axis rib.

9. The power storage apparatus according to claim 4, wherein when viewing the shielding member from a side of the wall where the electrode assembly is located toward the inner surface of the wall, the Y-axis rib exists within a plane defined by a contour of the shielding portion.

10. The power storage apparatus according to claim 1, wherein:
the shielding member has the form of a box and includes a center axis extending in a direction of the Y-axis; and
the shielding member includes
a gas inlet provided in an opening at one axial end,
a gas outlet open toward the pressure release valve in another axial end, and
a path changing wall located in a gas path from the gas inlet to the gas outlet.

11. The power storage apparatus according to claim 1, wherein the X-axis rib includes a projecting end projecting from the shielding portion toward the wall to a position beyond the positive electrode conductive member.

12. The power storage apparatus according to claim 11, wherein the projecting end of the X-axis rib is spaced apart from the inner surface of the wall.

13. The power storage apparatus according to claim 1, further comprising a movement restriction member that restricts movement of the shielding member in the direction of the Y-axis between the inner surface of the wall and the end face of the electrode assembly.

14. The power storage apparatus according to claim 13, wherein
the movement restriction member that restricts movement of the shielding member toward the positive electrode conductive member is the positive electrode conductive member, and
the movement restriction member that restricts movement of the shielding member toward the negative electrode conductive member is a tab group configured by gathering the negative electrode tabs in the direction of the X-axis.

15. The power storage apparatus according to claim 13, wherein the movement restriction member that restricts movement of the shielding member toward the positive electrode conductive member is the positive electrode conductive member, and the movement restriction member that restricts movement of the shielding member toward the negative electrode conductive member is the negative electrode conductive member.

16. The power storage apparatus according to claim 1, wherein
the positive electrode tab and the negative electrode tab project from the end face of the electrode assembly and are spaced apart from each other in the direction of the Y-axis, and
the shielding member includes a baffle plate that overlaps the positive electrode tab and the negative electrode tab as viewed from an outer surface of the wall and covers the positive electrode tab and the negative electrode tab along the direction of the Y-axis.

17. The power storage apparatus according to claim 1, wherein one of the positive electrode conductive member and the negative electrode conductive member includes an overlapping portion that overlaps the wall and the shielding portion as viewed from an outer surface of the wall.

18. The power storage apparatus according to claim 17, wherein the one of the conductive members includes a bent portion that is bent so that the overlapping portion is directed toward the pressure release valve.

19. The power storage apparatus according to claim 1, wherein a center position of the pressure release valve in the direction of the Y-axis is closer to the negative electrode conductive member than a center position between the positive electrode tab and the negative electrode tab in the direction of the Y-axis.

20. A power storage apparatus comprising:
an electrode assembly having a layered structure and including electrodes that are insulated from each other and have different polarities;
an electrolytic solution;
a case that accommodates the electrode assembly and the electrolytic solution;
a pressure release valve that exists in a wall of the case and is configured to be ripped open when pressure in the case reaches a release pressure in order to release the pressure out of the case; and
a shielding member located between an inner surface of the wall and an end face of the electrode assembly facing the inner surface, wherein
an axis extending in a stacking direction of the electrodes is referred to as an X-axis,
an axis orthogonal to the X-axis and parallel to the wall is referred to as a Y-axis,
a point located in a center of the case in a front view of the case taken in a direction of the X-axis and located in a center of a dimension of the electrode assembly in the direction of the X-axis is referred to as a center point,
a region surrounded by a plane connecting the center point and a contour of the pressure release valve at a shortest distance is referred to as a three-dimensional region,
the shielding member includes a shielding portion that at least partially covers a cross section of the three-dimensional region along the end face of the electrode assembly,
the electrodes having different polarities are a positive electrode and a negative electrode, the positive electrode and the negative electrode include a positive electrode tab and a negative electrode tab, respectively, and the positive electrode tab is shaped to project from the end face of the electrode assembly,
the power storage apparatus further comprises:
a positive electrode conductive member connected to the positive electrode tab; and
a negative electrode conductive member connected to the negative electrode tab,
the positive electrode conductive member and the negative electrode conductive member are lined in a direction of the Y-axis,
the shielding member includes an X-axis rib extending in the direction of the X-axis and located between the positive electrode conductive member and the pressure release valve,
a gap is formed between the positive electrode tab and the X-axis rib in the direction of the Y-axis, and
a gas striking member covers the gap from a side of the wall where the gap is located.

21. The power storage apparatus according to claim 1, wherein the shielding member is spaced apart from an inner surface of the case.

22. The power storage apparatus according to claim 1, wherein the shielding member is arranged on the end face of the electrode assembly.

23. The power storage apparatus according to claim 1, wherein the shielding member is made of metal.

24. The power storage apparatus according to claim 1, wherein the shielding member is heat resistant.

25. The power storage apparatus according to claim 1, wherein the inner surface of the shielding member has a flat planar shape.

26. The power storage apparatus according to claim 1, wherein the shielding portion entirely covers the cross section of the three-dimensional region along the end face of the electrode assembly.

27. The power storage apparatus according to claim 1, wherein the shielding member is integrated with the wall portion.

28. The power storage apparatus according to claim 1, wherein the shielding portion includes an edge extending in the direction of the X-axis, and the X-axis rib is projected toward the wall from the edge extending in the direction of the X-axis.

29. The power storage apparatus according to claim 28, wherein the X-axis rib includes a gas passage hole.

30. A power storage apparatus comprising:
an electrode assembly having a layered structure and including electrodes that are insulated from each other and have different polarities;
an electrolytic solution;
a case that accommodates the electrode assembly and the electrolytic solution;
a pressure release valve that exists in a wall of the case and is configured to be ripped open when pressure in the case reaches a release pressure in order to release the pressure out of the case; and
a shielding member located between an inner surface of the wall and an end face of the electrode assembly facing the inner surface, wherein
an axis extending in a stacking direction of the electrodes is referred to as an X-axis,
an axis orthogonal to the X-axis and parallel to the wall is referred to as a Y-axis,
a point located in a center of the case in a front view of the case taken in a direction of the X-axis and located in a center of a dimension of the electrode assembly in the direction of the X-axis is referred to as a center point, a region surrounded by a plane connecting the center point and a contour of the pressure release valve at a shortest distance is referred to as a three-dimensional region, the shielding member includes a shielding portion that at least partially covers a cross section of the three-dimensional region along the end face of the electrode assembly, the electrodes having different polarities are a positive electrode and a negative electrode, the positive electrode and the negative electrode include a positive electrode tab and a negative electrode tab, respectively, and the positive electrode tab is shaped to project from the end face of the electrode assembly, the power storage apparatus further comprises:
 a positive electrode conductive member connected to the positive electrode tab; and
 a negative electrode conductive member connected to the negative electrode tab, the positive electrode conductive member and the negative electrode conductive member are lined in a direction of the Y-axis, the shielding member includes an X-axis rib extending in the direction of the X-axis and located between the positive electrode conductive member and the pressure release valve, a path of gas directed in a planar direction of the wall toward the pressure release valve from a side where the positive electrode conductive member is located defines a positive electrode side gas discharge path, a path of the gas in the planar direction of the wall directed toward the pressure release valve from a side where the negative electrode conductive member is located defines a negative electrode side gas discharge path, and the positive electrode side gas discharge path has a flow path cross-sectional area smaller than that of the negative electrode side gas discharge path.

* * * * *

UNITED STATES PATENT AND TRADEMARK OFFICE
CERTIFICATE OF CORRECTION

PATENT NO. : 11,211,668 B2
APPLICATION NO. : 16/088349
DATED : December 28, 2021
INVENTOR(S) : Nakamura et al.

It is certified that error appears in the above-identified patent and that said Letters Patent is hereby corrected as shown below:

On the Title Page

Item (30), Foreign Application Priority Data:
Delete "Aug. 15, 2016 (JP).............................JP2016-159347
Aug. 15, 2016 (JP).............................JP2016-159347"
Insert --Mar. 31, 2016 (JP).............................JP2016-072534
Aug. 15, 2016 (JP).............................JP2016-159347"--

Signed and Sealed this
Seventh Day of June, 2022

Katherine Kelly Vidal
*Director of the United States Patent and Trademark Office*